United States Patent
Oshima et al.

(10) Patent No.: US 11,442,426 B2
(45) Date of Patent: Sep. 13, 2022

(54) SEMICONDUCTOR DEVICE, MOTOR CONTROL SYSTEM, AND ERROR DETECTION METHOD

(71) Applicant: RENESAS ELECTRONICS CORPORATION, Tokyo (JP)

(72) Inventors: Yutaka Oshima, Tokyo (JP); Hisaaki Watanabe, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 175 days.

(21) Appl. No.: 16/829,583

(22) Filed: Mar. 25, 2020

(65) Prior Publication Data
US 2020/0341447 A1    Oct. 29, 2020

(30) Foreign Application Priority Data
Apr. 23, 2019  (JP) .............................. JP2019-081522

(51) Int. Cl.
G05B 19/31  (2006.01)
G05B 19/35  (2006.01)
H02K 24/00  (2006.01)

(52) U.S. Cl.
CPC ........... *G05B 19/353* (2013.01); *H02K 24/00* (2013.01); *G05B 2219/41065* (2013.01)

(58) Field of Classification Search
CPC ........ G05B 19/353; G05B 2219/41605; H02K 24/00; H02P 23/14
See application file for complete search history.

(56) References Cited

U.S. PATENT DOCUMENTS

| | | | |
|---|---|---|---|
| 4,633,423 A * | 12/1986 | Bailey | G01P 3/489 318/618 |
| 10,075,123 B2 | 9/2018 | Yasuda | |
| 2004/0052523 A1* | 3/2004 | Yadlowsky | H04J 14/0227 398/34 |
| 2007/0132423 A1 | 6/2007 | Ajima et al. | |

FOREIGN PATENT DOCUMENTS

| | | |
|---|---|---|
| JP | 2007-166735 A | 6/2007 |
| JP | 2011-237459 A | 11/2011 |
| JP | 2012-042411 A | 3/2012 |
| JP | 2015-094635 A | 5/2015 |
| JP | 2018-061350 A | 4/2018 |

OTHER PUBLICATIONS

Japanese Notice of Reasons for Refusal issued in corresponding Japanese Patent Application No. 2019-081522, dated Jul. 5, 2022, with English translation.

* cited by examiner

Primary Examiner — Karen Masih
(74) Attorney, Agent, or Firm — McDermott Will & Emery LLP

(57) ABSTRACT

According to semiconductor device includes a domain converter for converting a digitized resolver signal from a time-domain to a frequency-domain, a spectrum analyzer for analyzing a spectrum of the resolver signal converted to a frequency-domain by the domain converter, and an error detector for detecting an error related to the resolver signal based on an output signal from the spectrum analyzer.

17 Claims, 21 Drawing Sheets

FIG. 8 f(t)sinθ

| Frequency | Real part | Imaginary part |
|---|---|---|
| 0 (Direct current) | R0s | I0s |
| ω1 | R1s | I1s |
| ω2 | R2s | I2s |
| ω3 | R3s | I3s |
| ω4 | R4s | I4s | f(t)cosθ

| Frequency | Real part | Imaginary part |
|---|---|---|
| 0 (Direct current) | R0c | I0c |
| ω1 | R1c | I1c |
| ω2 | R2c | I2c |
| ω3 | R3c | I3c |
| ω4 | R4c | I4c |

SEMICONDUCTOR DEVICE, MOTOR CONTROL SYSTEM, AND ERROR DETECTION METHOD

CROSS-REFERENCE TO RELATED APPLICATIONS

The disclosure of Japanese Patent Application No. 2019-081522 filed on Apr. 23, 2019 including the specification, drawings and abstract is incorporated herein by reference in its entirety.

BACKGROUND

The invention relates to semiconductor device, motor control systems, and error-detection method.

A motor control system is known in which the rotation angle θ of a motor is detected by a resolver, the detected resolver signal is converted into a digital signal by a resolver/digital converter, and the motor is feedback controlled. The resolver is an angle sensor that includes a stator and a rotor that rotates inside the stator. The rotor is fixed to, for example, the outer peripheral surface of the rotation shaft of the motor and rotates together with the rotation shaft of the motor. Therefore, the rotation angle of the resolver is equal to the rotation angle θ of the motor.

The resolver signal is, for example, a two-phase analog signal in which sin θ and cos θ are superimposed on an excitation signal proportional to sin ωct. Where ωc is the frequency of the excitation signal (hereinafter referred to as "excitation frequency") and t is time. Therefore, the two resolver signals can be expressed as A sin ωct·sin θ and A sin ωct·cos θ, where A is the amplitude. That is, in theory, the two resolver signals have the same amplitude A and a phase difference Δφ=90°.

Therefore, based on the resolver signal, errors (abnormalities) such as the amplitude A of the resolver signal, the phase difference Δφ, the resolver rotation frequency ωr (=dθ/dt), and the excitation frequency ωc can be detected.

Japanese Unexamined Patent Application Publication No. 2012-42411 discloses error-detection method in resolver signals.

SUMMARY

Because resolver signals are susceptible to various noises, detection accuracy has been problematic in real-time error detection of resolver signals as disclosed in Patent Document 1. Other objects and novel features will become apparent from the description of this specification and the accompanying drawings.

According to semiconductor device includes a domain converter for converting a digitized resolver signal from a time-domain to a frequency-domain, a spectrum analyzer for analyzing a spectrum of the resolver signal converted to a frequency-domain, and an error detector for detecting an error related to the resolver signal based on an output signal from the spectrum analyzer.

According to the above embodiment, it is possible to accurately detect an error related to the resolver signal.

BRIEF DESCRIPTION OF THE DRAWINGS

FIG. 8 is a table showing an example of the frequency domain signal fd stored in the register REG.

DETAILED DESCRIPTION

Figure 1:
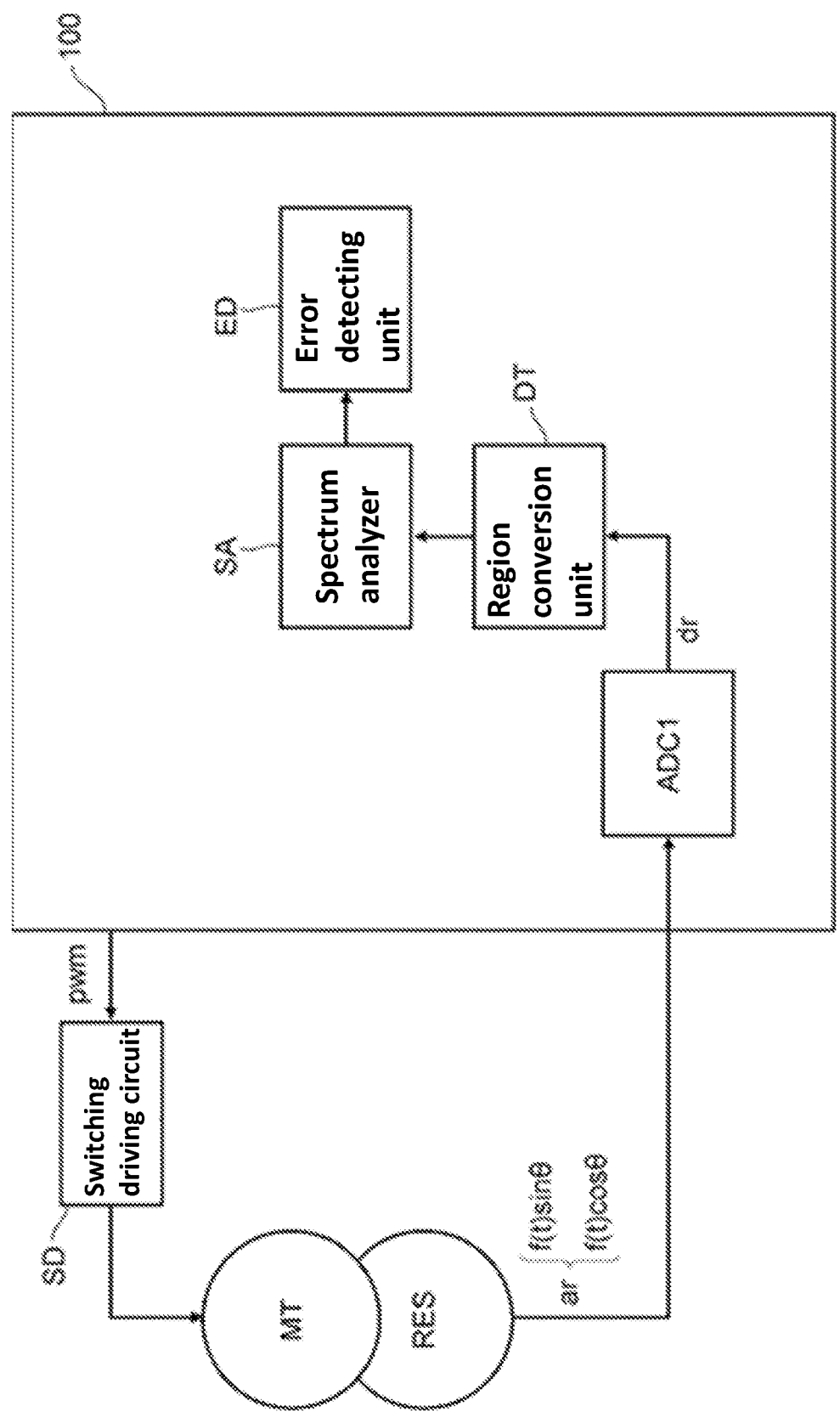
FIG. 1 is a diagram a configuration of a according to semiconductor device 100 according to a first embodiment.

For clarity of explanation, the following description and drawings are appropriately omitted and simplified. In addition, the elements described in the drawings as functional blocks for performing various processes can be configured as CPUs (Central Processing Unit), memories, and other circuits in terms of hardware, and are realized by programs loaded into the memories in terms of software. According to, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

First Embodiment

<Configuration of the Semiconductor Device 100>

First, with reference to FIG. 1, a description will be given of a semiconductor device and a motor control system according to the first embodiment. FIG. 1 is a block diagram a configuration of a according to semiconductor device 100 according to a first embodiment of the present invention. As shown in FIG. 1, according to semiconductor device 100 according to the first embodiment includes an analog/digital converter ADC1, a domain converter DT, a spectrum analyzer SA, and an error detector ED.

Semiconductor device 100 outputs a pulse control signal pwm for controlling the switching driving circuit SD based on the analog resolver signal ar outputted from the resolver RES. FIG. 1 illustrates a motor control system in which a resolver RES detects a rotational angle θ of a motor MT, and a switching driving circuit SD drives the motor MT based on a pulse control signal pwm outputted from a semiconductor device 100. Semiconductor device 100 is a semiconductor device for motor control which constitutes a motor control system.

The resolver RES is an angle sensor including a stator and a rotor rotating inside the stator. The rotor is fixed to, for example, the outer peripheral surface of the rotation shaft of the motor MT, and rotates together with the rotation shaft of the motor MT. Therefore, the rotation angle of the resolver RES is equal to the rotation angle θ of the motor MT.

As described above, the analog resolver signal ar output from the resolver RES is a two-phase signal in which sin θ and cos θ are superimposed on the excitation signal represented by the function f(t) of the time t. Therefore, as shown in FIG. 1, the two analog resolver signals ar can be expressed as f(t)sin θ and f(t)cos θ.

Figure 2:
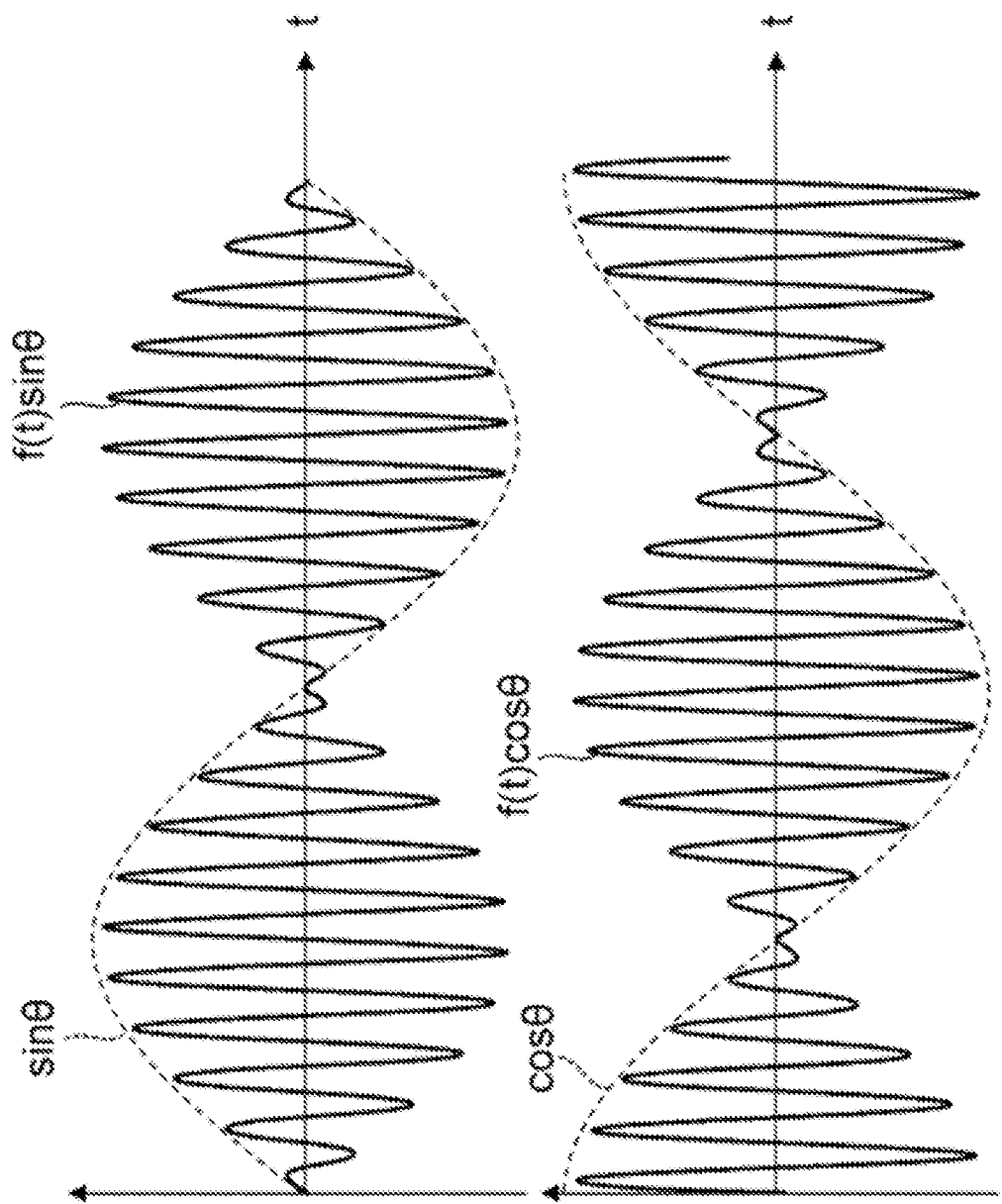
FIG. 2 is a graph showing waveforms of two analog resolver signals ar(f(t)sin θ and f(t)cos θ).

Here, FIG. 2 is a graph showing waveforms of two analog resolver signals ar (f(t)sin θ and f(t)cos θ). The excitation signal represented by f(t) is proportional to, for example, sin $\omega c t$ with the excitation frequency $\omega c$. Therefore, the two analog resolver signals ar can be expressed as A sin $\omega c t$·sin θ and A sin $\omega c t$·cos θ, where A is the amplitude. That is, in theory, the two resolver signals have the same amplitude A and a constant phase difference $\Delta\varphi = 90°$.

Semiconductor device 100 will be described. The analog/digital converter ADC1 converts the analog resolver signal ar outputted from the resolver RES into a digital resolver signal dr. Here, the digital resolver signal dr can be expressed as A sin $\omega c t$·sin θ and A sin $\omega c t$·cos θ similarly to the analog resolver signal ar. The domain conversion unit DT converts the digital resolver signal dr from the time domain into the frequency domain. For example, the region transform unit DT performs Fourier-transform on the digital resolver signal dr.

The spectrum analyzer SA analyses the spectrum of the digital resolver signal dr converted into the frequency domain. The spectrum analyzer SA analyzes at least one of the power spectrum and the phase difference spectrum. The spectrum analyzer SA may analyze the amplitude spectrum instead of the power spectrum.

Figure 3:
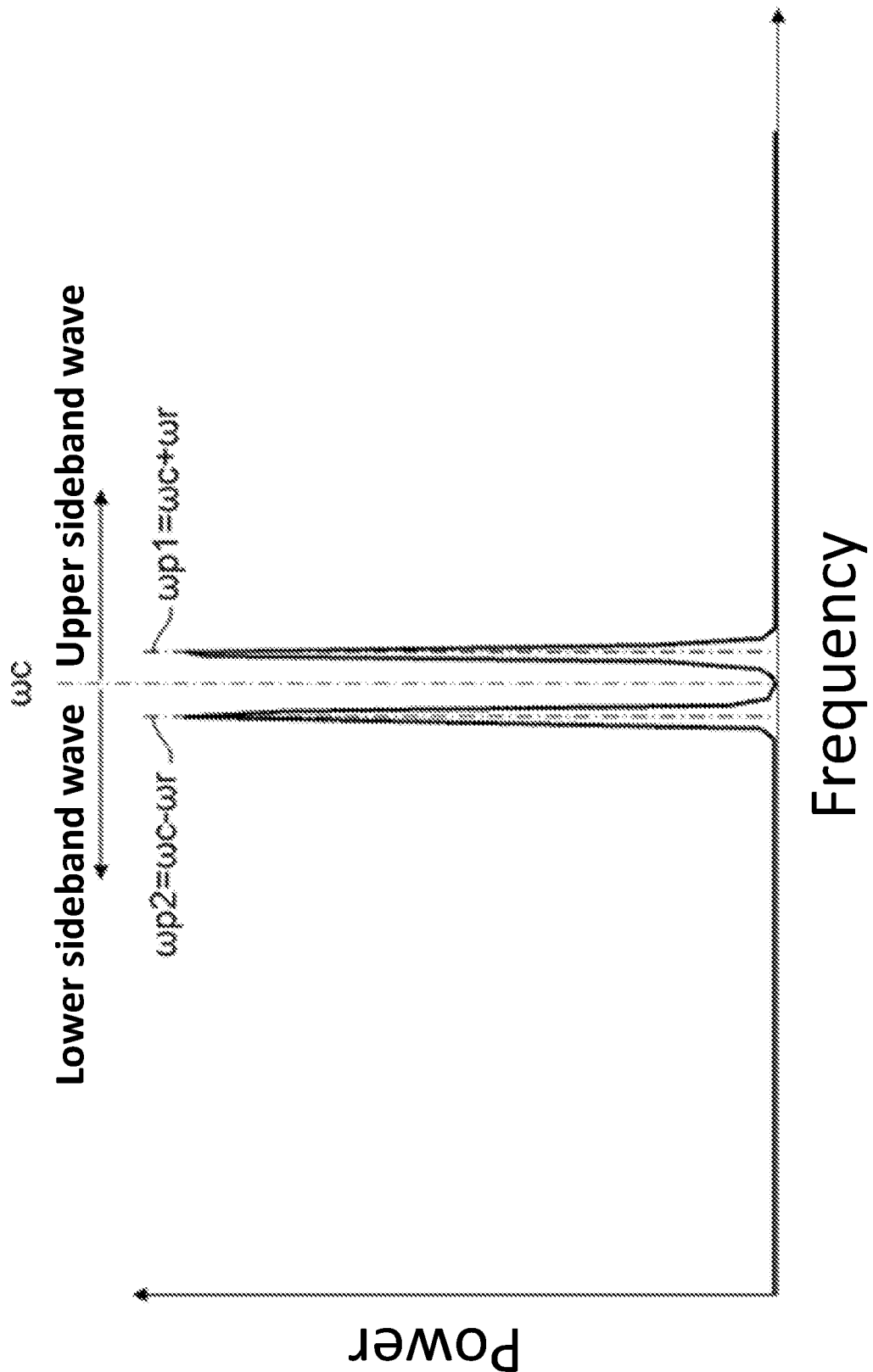
FIG. 3 is a power spectrum of the Fourier-transformed resolver signal is a graph schematically showing.

FIG. 3 is a graph schematically showing the power spectrum of the Fourier-transformed resolver signal. In FIG. 3, the horizontal axis represents frequency, and the vertical axis represents power. As shown in FIG. 3, in the power spectrum of the Fourier-transformed resolver signal, a maximum peak occurs in each of the upper sideband wave and the lower sideband wave with the excitation frequency $\omega c$ as the center. As shown in FIG. 3, when the frequency at the maximum peak (hereinafter referred to as "peak frequency") is $\omega p1$ and $\omega p2$, $\omega p1 = \omega c + \omega r$ and $\omega p2 = \omega c - \omega r$. $\omega r$ is the resolver rotation frequency.

Here, the equations of the excitation frequency $\omega c = (\omega p1 + \omega p2)/2$ and the resolver rotation frequency $\omega r = (\omega p1 - \omega p2)/2$ are satisfied. Therefore, in the spectrum analyzing section SA, the excitation frequency $\omega c$ and the resolver rotation frequency $\omega r$ can be obtained with high accuracy and easily from the two peak frequencies $\omega p1$ and $\omega p2$.

Figure 4:
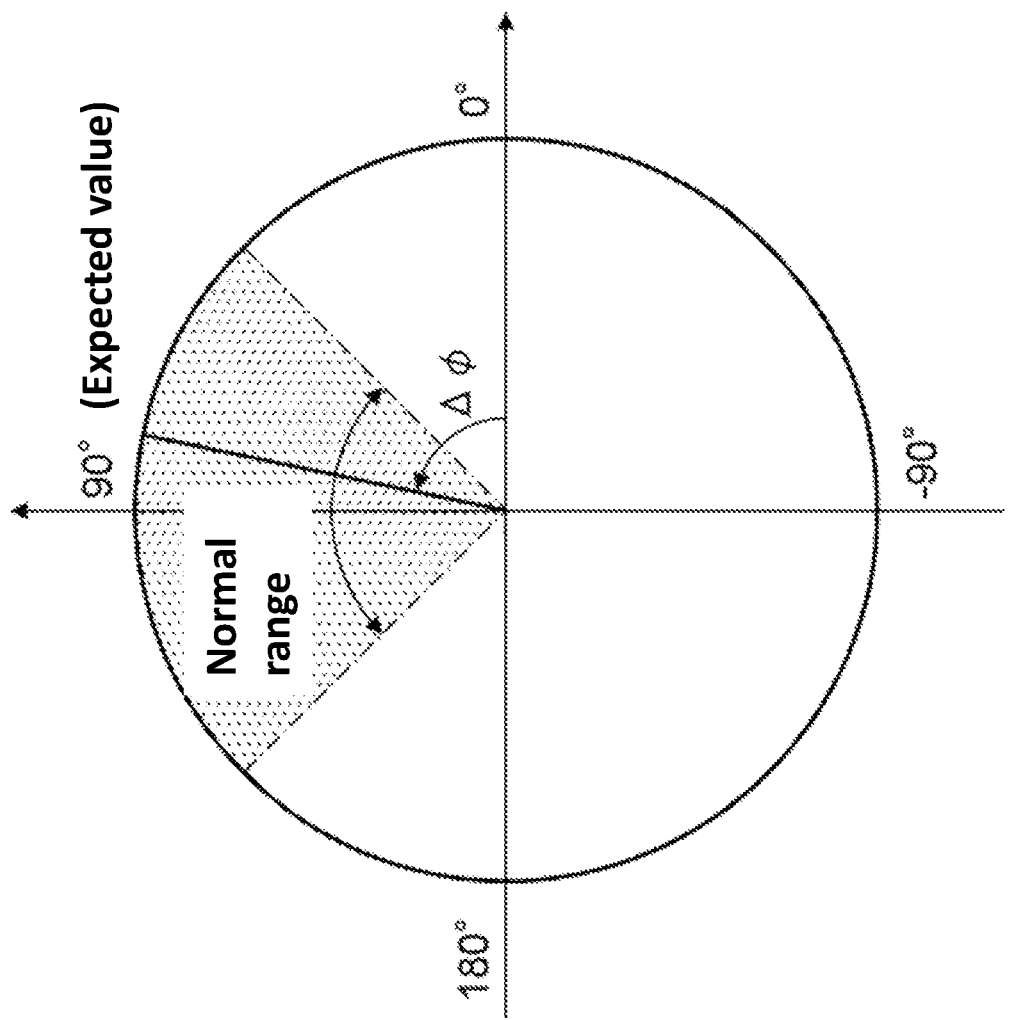
FIG. 4 is a phase difference spectrum of the Fourier-transformed resolver signal is a complex unit circle schematically showing.

FIG. 4 is a complex unit circle schematically showing the phase difference spectrum of the Fourier-transformed resolver signal. The complex unit circle shown in FIG. 4 indicates the phase difference $\Delta\varphi$ between the two resolver signals, i.e., the sine phase and the cosine phase. The phase difference $\Delta\varphi$ between the two resolver signals can be accurately and easily obtained by the phase difference spectrum.

The error detector ED detects an error related to the resolver signal based on the output signal from the spectrum analyzer SA. In other words, the error detection unit ED detects an error related to the resolver signal based on an analysis result of the spectrum of the resolver signal converted into the frequency domain.

For example, the observed values of the excitation frequency $\omega c$ and the resolver rotation frequency $\omega r$ calculated by the spectrum analysis unit SA are compared with the designated values, and errors of the excitation frequency $\omega c$ and the resolver rotation frequency $\omega r$ can be detected with high accuracy and easily. Also, errors in the power, i.e., amplitude, of the resolver signal can be detected with high accuracy and easily from the power values at the peak frequencies $\omega p1$ and $\omega p2$.

Further, since peaks appearing at frequencies other than the two peak frequencies $\omega p1$ and $\omega p2$ are noise, abnormal noise can also be detected from the peak values with high accuracy and easily. Moreover, the error of the direct current component can be easily and accurately detected from the power value in the frequency 0. When the error detection unit ED performs the error detection using the power spectrum, it is not necessary to perform all the error detection.

As shown in FIG. 4, by comparing the obtained phase difference $\Delta\varphi$ with an expected value of 90°, an error in the phase difference $\Delta\varphi$ of the resolver signal can be detected with high accuracy and easily. For example, as shown in FIG. 4, when the phase difference $\Delta\varphi$ between the two resolver signals, i.e., the sine phase and the cosine phase, deviates from a predetermined normal range centering on the expected value of 90°, the error detection unit ED detects an error.

As described above, in the semiconductor device 100 according to present embodiment, the resolver signal is converted from the time-domain to the frequency-domain in the domain converter DT, and the spectrum of the resolver signal converted to the frequency-domain is analyzed in the spectrum analyzer SA. That is, the spectrum of the resolver signal converted from the time domain to the frequency domain is analyzed.

The resolver signal has only two frequency components, an excitation frequency $\omega c$ and a resolver rotation frequency $\omega r$. Therefore, as compared with detecting an error in real-time, present embodiment according to semiconductor device 100 suppresses the effect of noises and can detect an error with high accuracy and easily. Further, since error detection is facilitated, for example, the circuit configuration of the error detection unit ED can be simplified, and the chip area of semiconductor device 100 can be reduced.

<Detailed Configuration of the Semiconductor Device 100>

Figure 5:
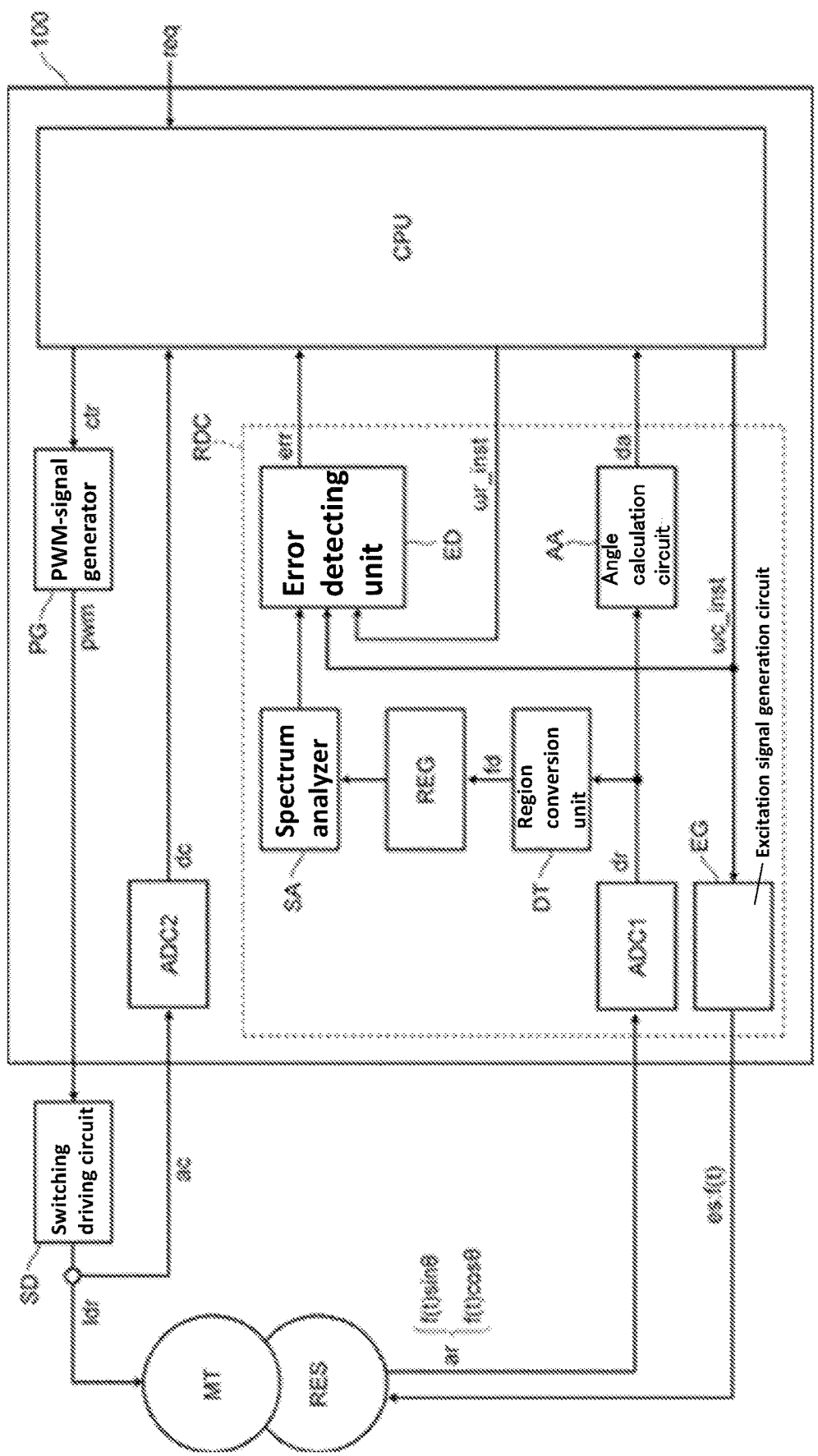
FIG. 5 is a detailed block diagram a configuration of a according to semiconductor device 100 according to the first embodiment.

Next, with reference to FIG. 5, a semiconductor device according to the first embodiment will be described in more detail. FIG. 5 is a detailed block diagram the configuration of according to semiconductor device 100 according to the first embodiment. As shown in FIG. 5, semiconductor device 100 includes a resolver/digital converter RDC, a processor CPU, a PWM-signal generator PG, and an analog/digital converter ADC2.

Here, the resolver/digital converter RDC includes all of the analog/digital converter ADC1, the region converter DT, the spectrum analyzer SA, and the error detector ED shown in FIG. 1. The resolver/digital converter RDC further includes a register REG, an angle calculation circuit AA, and an excitation signal generation circuit EG.

The analog/digital converter ADC2 converts the analog current signal ac into a digital current signal dc, and outputs the digital current signal dc to the processor CPU. The analog current signal ac is a signal obtained by detecting the drive current Idr output from the switching drive circuit by a current sensor or the like.

The resolver/digital converter RDC converts the analog resolver signal ar output from the resolver RES into a digital angle signal da, and outputs the digital angle signal da to the processing unit CPU. More particularly, the analog/digital converter ADC1 converts the analog resolver signal ar into a digital resolver signal dr. Then, the angle calculation circuit AA calculates the digital angle signal da from the digital resolver signal dr, and outputs the digital angle signal da to the processing unit CPU. The digital angle signal da is a digital value of the rotation angle $\theta$ of the resolver.

The excitation signal generation circuit EG in the resolver/digital converter RDC outputs an excitation signal es represented by f(t) based on the excitation frequency instruction value $\omega c\_inst$ output from the processing unit CPU. Here, as described above, the excitation signal es represented by f(t) is proportional to, for example, sin $\omega ct$. That is, the excitation signal generation circuit EG sets the excitation frequency $\omega c$ to the excitation frequency instruction value $\omega c\_inst$, and outputs the excitation signal es. As shown in FIG. 5, the excitation frequency instruction value $\omega c\_inst$ is also input to the error detection unit ED.

The processing unit CPU generates a control signal ctr based on the digital angle signal da, the digital current signal dc, and the request signal req. The control signal ctr is output to the PWM signal generation circuit PG. The processor CPU is, for example, a CPU (Central Processing Unit). The demand signal req is inputted from the outside of semiconductor device 100, and is a signal indicating, for example, an instruction of the rotation speed of the motor MT.

More specifically, the processing unit CPU calculates the current rotation speed of the motor MT from the digital angle signal da and the digital current signal dc fed back from the motor MT. Then, the processing unit CPU compares the calculated current rotation speed of the motor MT with the request signal req, and outputs a control signal ctr for increasing or decreasing the rotation speed of the motor MT. The PWM signal generation circuit PG generates the pulse control signal pwm based on the control signal ctr output from the processing unit CPU, and outputs the pulse control signal pwm to the switching drive circuit SD.

In present embodiment according to semiconductor device 100, the resolver/digital converter RDC comprises a domain converter DT, a register REG, a spectrum analyzer SA and an error detector ED.

Figure 6:
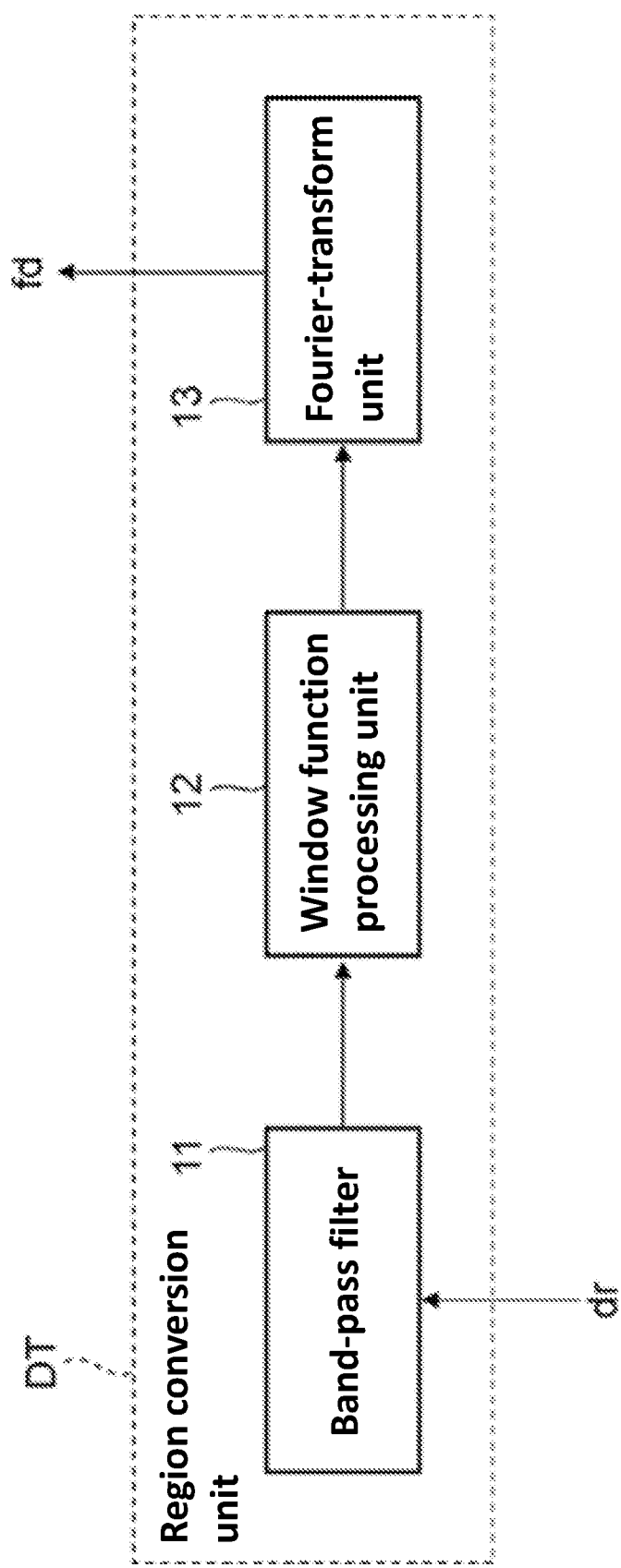
FIG. 6 is a block diagram an example of a region conversion unit DT.

First, the domain conversion unit DT will be described. Here, FIG. 6 is a block diagram an example of the domain conversion unit DT. In the example of FIG. 6, the region transform unit DT includes a band-pass filter 11, a window function processing unit 12, and a Fourier-transform unit 13. That is, in the example shown in FIG. 6, the Fourier-transform is used as the time domain/frequency domain transform.

The band-pass filter 11 passes only a predetermined range of frequencies of the digital resolver signal dr. The band-pass filter 11 can suppress noise of the digital resolver signal dr. In this manner, noise is removed from the digital resolver signal dr by the band pass filter 11 before converting the digital resolver signal dr from the time domain to the frequency domain. Here, the range of the frequency passed by the band-pass filter 11 is appropriately set from the range that can be taken by the excitation frequency $\omega c$ and the resolver rotation frequency $\omega r$. A low-pass filter is used instead of the band-pass filter 11.

Figure 7:
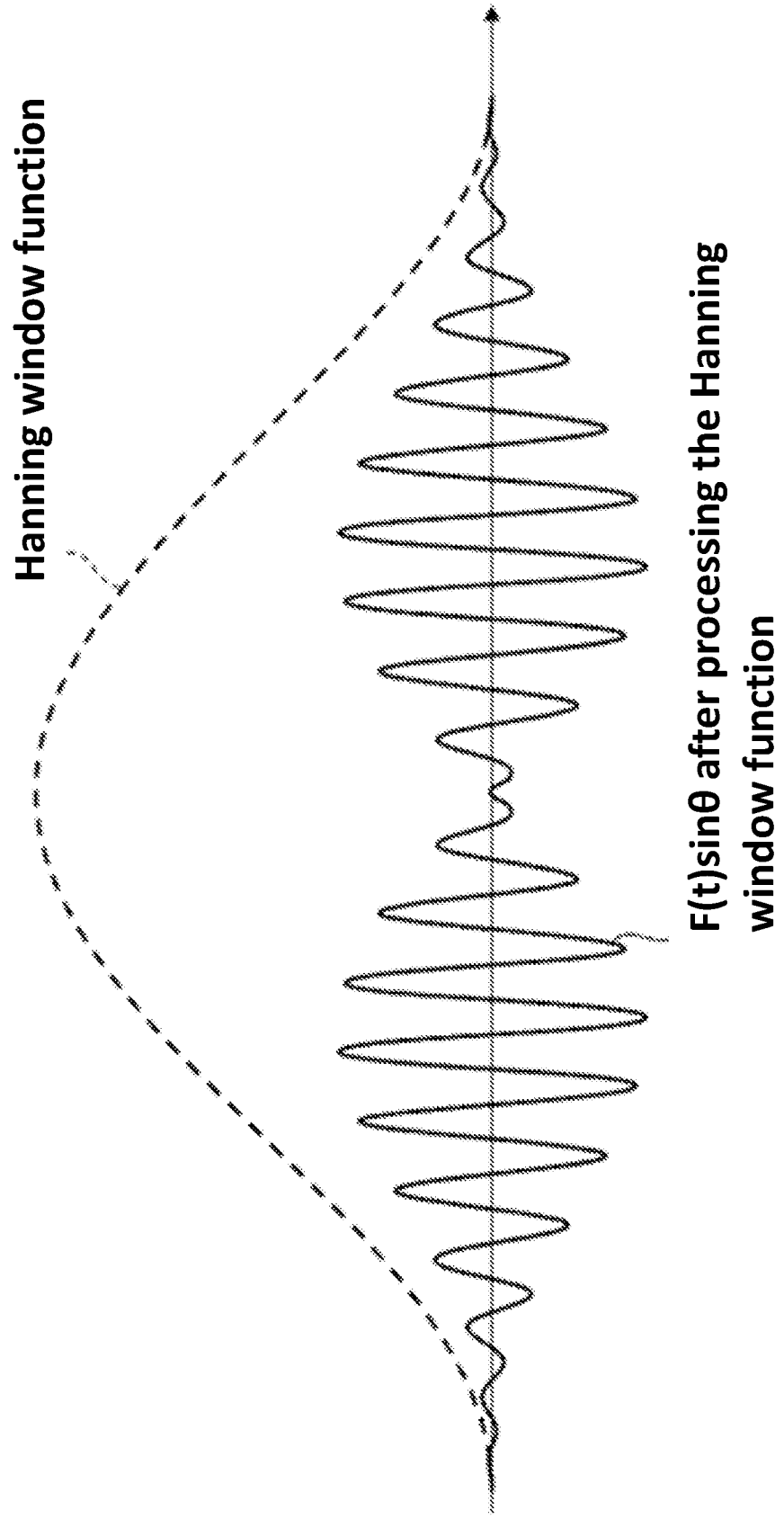
FIG. 7 is a graph showing a state in which f(t)sin θ of the digital resolver signal dr is subjected to window function processing by a Hanning window.

The window function processing unit 12 performs window function processing on the digital resolver signal dr that has passed through the band pass filter 11. Window function processing can reduce errors due to time windows in Fourier-transforms. As described above, the window function processing unit 12 may perform the window function processing on the digital resolver signal dr before the Fourier-transform unit 13 performs the Fourier-transform on the digital resolver signal dr. Here, FIG. 7 is a graph showing a state in which f(t)sin $\theta$ of the digital resolver signal dr is subjected to window function processing by a Hanning window.

The Fourier-transform unit 13 performs Fourier-transform on the digital resolver signal dr subjected to the window function processing. The digital resolver signal dr is converted from the time domain to the frequency domain by the Fourier-transform unit 13. A frequency domain signal fd, which is a resolver signal after Fourier-transform, is output from the Fourier-transform unit 13. The Fourier-transform unit 13 is composed of, for example, a fast Fourier-transform circuit. The processing speed is increased by using a fast Fourier-transform circuit.

Next, register REG will be described. The register REG temporarily holds the frequency domain signal fd, for example. Here, FIG. 8 is a table showing an example of the frequency domain signal fd stored in the register REG. As shown in FIG. 8, for each of the two resolver signals (f(t)sin $\theta$ and f(t)cos $\theta$), the value of the frequency domain signal fd after Fourier-transform is held in the register REG. Specifically, the real part and the imaginary part are held in the register REG for each frequency.

In the example of FIG. 8, the values of the real part and the imaginary part of the frequencies 0 and $\omega 1$ to $\omega 4$ are held in the register REG as data. It will be appreciated that, in practice, data for more frequencies is retained. In order to reduce the number of data, the register REG may hold data only around the frequency 0 and around the two peak frequencies $\omega p1$ (=$\omega c+\omega r$) and $\omega p2$ (=$\omega c-\omega r$) shown in FIG. 3. For the resolver signal f(t)sin $\theta$, the values of the real part and the imaginary part at the frequency 0 are R0s and I0s, respectively. At frequencies $\omega 1$ to $\omega 4$, the values of the real part are R1s to R4s, and the values of the imaginary part are I1s to I4s, respectively. Similarly, for the resolver signal f(t)cos $\theta$, the values of the real part and the imaginary part at the frequency 0 are R0c and I0c, respectively. At frequencies $\omega 1$ to $\omega 4$, the values of the real part are R1s to R4s, and the values of the imaginary part are I1s to I4s, respectively. Instead of the register REG, the frequency domain signal fd is held in a memory.

Figure 9:
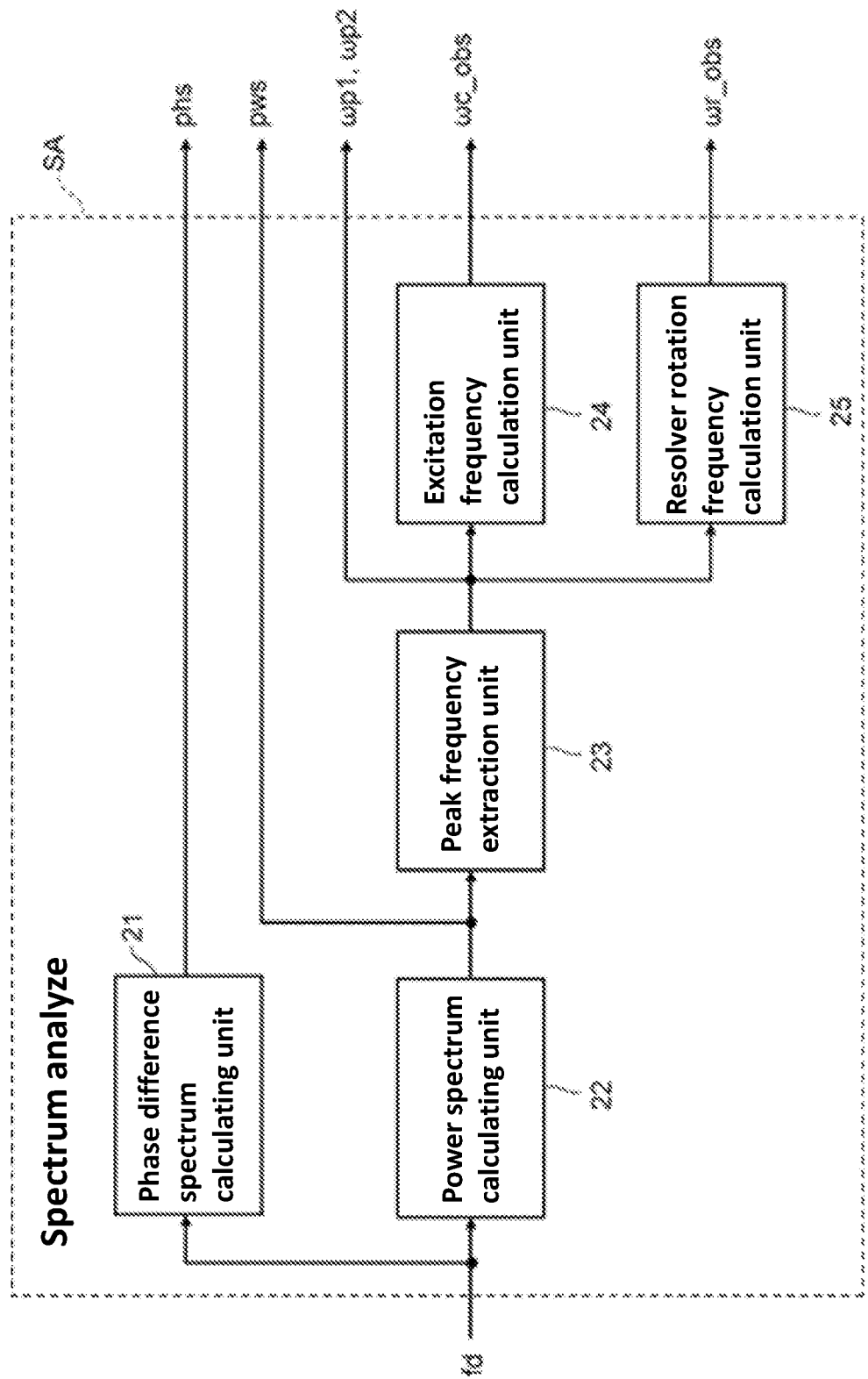
FIG. 9 is a block diagram an example of a spectrum analyzer SA.

Next, the spectrum analyzer SA will be described. FIG. 9 is a block diagram an example of the spectrum analyzing unit SA. In the example of FIG. 9, the spectrum analysis unit SA includes a phase difference spectrum calculation unit 21, a power spectrum calculation unit 22, a peak frequency extraction unit 23, an excitation frequency calculation unit 24, and a resolver rotation frequency calculation unit 25.

The phase difference spectrum calculating unit 21 calculates the phase difference $\Delta\varphi$ between the two resolver signals (f(t)sin θ and f(t)cos θ) for each frequency from the data held in the register REG. In the case where the data held in the register REG is the table shown in FIG. 8, the phase difference spectrum calculating unit 21 calculates the phase difference $\Delta\varphi$ between f(t)sin θ and f(t)cos θ for the frequencies 0 and ω1 to ω4. The phase difference spectrum calculation unit 21 outputs the calculated phase difference spectrum phs.

For example, in the case of the frequency ω1, the phase cps of the resolver signal f(t)sin θ is obtained from the real part R1s and the imaginary part I1s of the resolver signal f(t)sin θ. The phase ωc of the resolver signal f(t)cos θ is obtained from the real part R1c and the imaginary part I1c of the resolver signal f(t)cos θ. As a result, the phase difference $\Delta\varphi=\omega c-\omega s$ between the two signals is obtained. Here, since)cos θ=sin(θ+90°), the expected value of the phase difference $\Delta\varphi$ is 90° at any frequency.

The power spectrum calculating unit 22 calculates the power value of each frequency from the data held in the register REG for each of the two resolver signals (f(t)sin θ and f(t)cos θ). When the data held in the register REG is the table shown in FIG. 8, the power spectrum calculating unit 22 calculates the power values of the frequencies 0 and ω1 to ω4. The power spectrum calculating unit 22 outputs the calculated power spectrum pws.

The power value is the sum of squares of the real and imaginary parts. For example, at the frequency ω1, the power value of the resolver signal f(t)sin θ is equal to the power value of the resolver signal f(t)sin θ at the frequency ω1, and the power value of the resolver signal f(t)sin θ is equal to (R1s)2+(I1s)2. On the other hand, the power value of the resolver signal f(t)cos θ is (R1c)2+(I1c)2. By calculating the power values for all frequencies, the power spectra shown in FIG. 3 are obtained for each of the two resolver signals (f(t)sin θ and f(t)cos θ).

The peak frequency extraction unit 23 extracts the peak frequency at which the power value is maximum in each of the upper sideband wave and the lower sideband wave of the power spectrum shown in FIG. 3. That is, the peak frequency extraction unit 23 extracts and outputs the peak frequencies ωp1 and ωp2 shown in FIG. 3. Here, as shown in FIG. 3, a relationship of ωp1=ωc+ωr and ωp2=ωc−ωr is established between the two peak frequencies ωp1 and ωp2 and the excitation frequency ωc and the resolver rotation frequency ωr.

The excitation frequency calculation unit 24 calculates the excitation frequency ωc from the peak frequencies ωp1 and ωp2 output from the peak frequency extraction unit 23. More specifically, the excitation frequency calculation unit 24 calculates the excitation frequency ωc using the equation of the excitation frequency ωc=(ωp1+ωp2)/2. Then, the excitation frequency calculation unit 24 outputs the calculated excitation frequency ωc as the excitation frequency observation value ωc_obs. In this manner, the excitation frequency ωc can be obtained accurately and easily by using the two peak frequencies ωp1 and ωp2 extracted from the power spectrum.

The resolver rotation frequency calculation unit 25 calculates the resolver rotation frequency ωr from the peak frequencies ωp1 and ωp2 output from the peak frequency extraction unit 23. Specifically, the resolver rotation frequency ωr is calculated using an equation of the resolver rotation frequency ωr=(ωp1−ωp2)/2. Then, the resolver rotation frequency calculation unit 25 outputs the calculated resolver rotation frequency ωr as the resolver rotation frequency observation value ωr_obs. In this manner, the resolver rotation frequency ωr can be obtained accurately and easily by using the two peak frequencies ωp1 and ωp2 extracted from the power spectrum.

Figure 10:
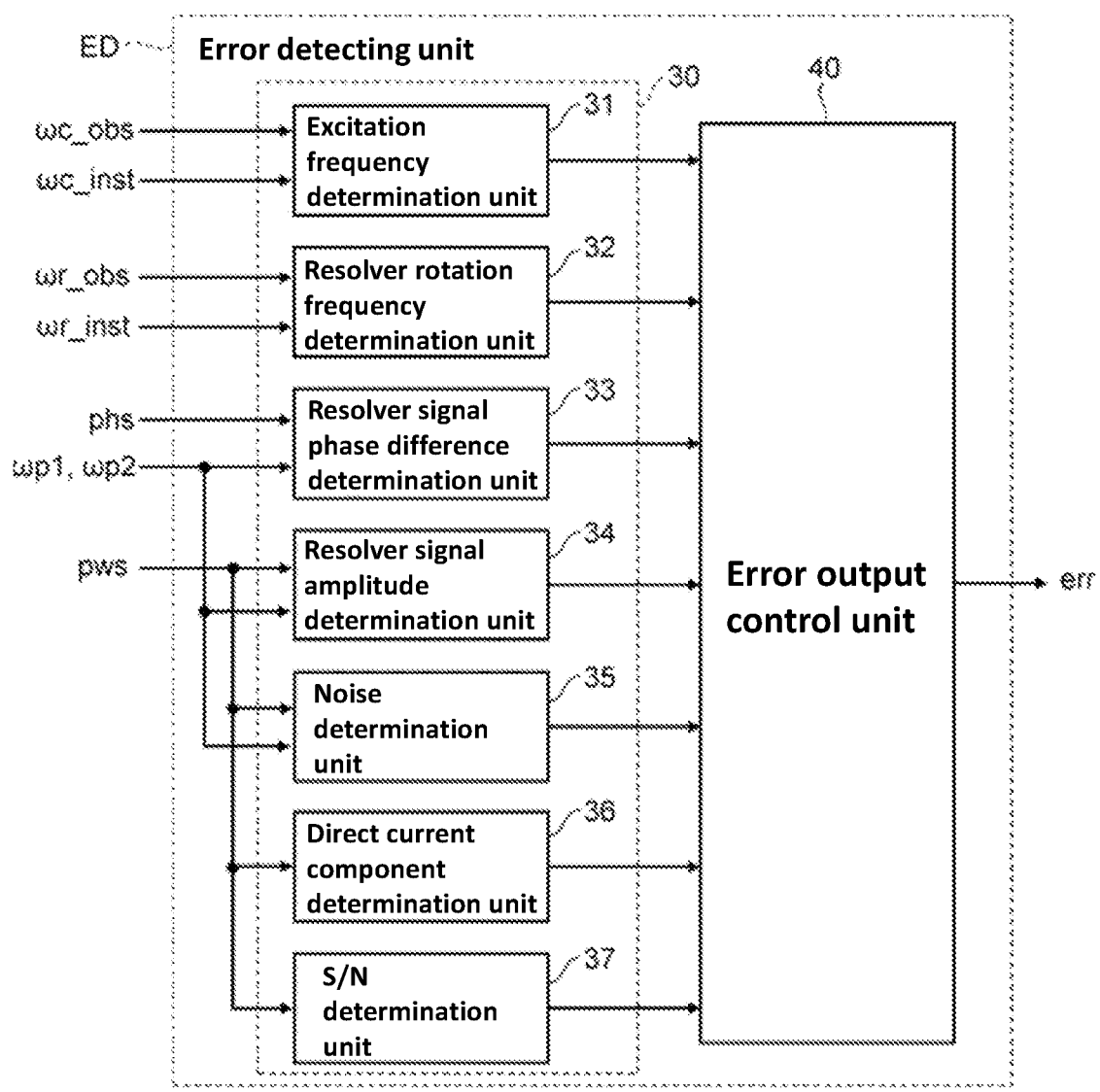
FIG. 10 is a block diagram an example of an error detecting unit ED.

Next, the error detection unit ED will be described. Here, FIG. 10 is a block diagram an example of the error detection unit ED. In the example of FIG. 10, the error detection unit ED includes an error determination unit 30 and an error output control unit 40. The error determination unit 30 includes an excitation frequency determination unit 31, a resolver rotation frequency determination unit 32, a resolver signal phase difference determination unit 33, a resolver signal amplitude determination unit 34, a noise determination unit 35, a direct current component determination unit 36, and an S/N determination unit 37.

As shown in FIG. 10, the excitation frequency determination unit 31 compares the excitation frequency observation value ωc_obs output from the excitation frequency calculation unit 24 with the excitation frequency instruction value ωc_inst and determines whether or not the excitation frequency ωc is an error. As shown in FIG. 5, the excitation frequency instruction value ωc_inst is output from the processing unit CPU. The excitation frequency determination unit 31 performs error determination using at least one of the excitation frequency observation values ωc_obs obtained from the two resolver signals (f(t)sin θ and f(t)cos θ).

Figure 11:
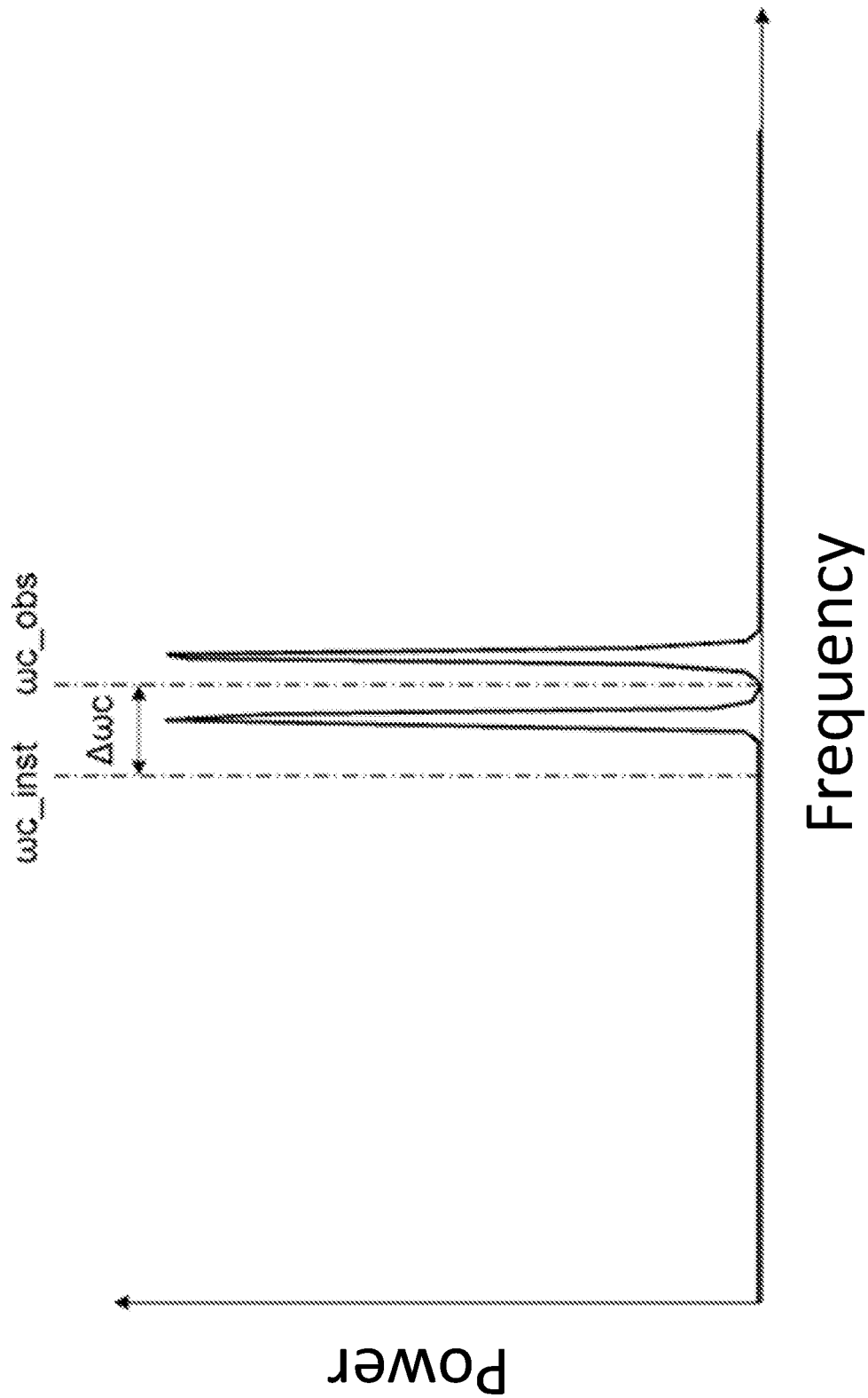
FIG. 11 is a graph of a power spectrum schematically showing an error determination method in the excitation frequency determination unit 31.

Here, FIG. 11 is a graph of a power spectrum schematically showing an error-detecting method in the excitation frequency determination unit 31. As shown in FIG. 11, when the deviation Δωc between the excitation frequency observation value ωc_obs and the excitation frequency indication value ωc_inst exceeds a predetermined reference value a predetermined number of times or for a predetermined time, the excitation frequency determination unit 31 determines that the excitation frequency ωc is an error.

Thus, by comparing the excitation frequency observation value ωc_obs with the excitation frequency indication value ωc_inst, it is possible to accurately and easily detect an error of the excitation frequency ωc. In addition, the circuit configuration of the excitation frequency determination unit 31 can be simplified. The excitation frequency determination unit 31 outputs the determination result to the error output control unit 40.

As shown in FIG. 10, the resolver rotation frequency determination unit 32 compares the resolver rotation frequency observation value ωr_obs output from the resolver rotation frequency calculation unit 25 with the resolver rotation frequency instruction value ωr_inst, and determines whether or not the resolver rotation frequency ωr is an error. The resolver rotation frequency determination unit 32 performs error determination using at least one of the resolver rotation frequency observation values ωr_obs obtained from the two resolver signals (f(t)sin θ and f(t)cos θ).

When the deviation Δωr between the observed resolver rotation frequency value ωr_obs and the indicated resolver rotation frequency value ωr_inst exceeds the predetermined reference value a predetermined number of times or for a predetermined period of time, the resolver rotation frequency determination unit 32 determines that the resolver rotation frequency ωr is an error. Here, as shown in FIG. 5, the resolver rotation frequency instruction value ωr_inst is output from the processing unit CPU based on the request signal req, i.e., the rotation speed instruction value of the motor MT.

As described above, by comparing the observed resolver rotation frequency value ωr_obs with the resolver rotation frequency instruction value ωr_inst, the error of the resolver rotation frequency r can be detected with high accuracy and easily. In addition, the circuit configuration of the resolver rotation frequency determination unit 32 can be simplified. The resolver rotation frequency determination unit 32 outputs the determination result to the error output control unit 40.

As shown in FIG. 10, the resolver signal phase difference determination unit 33 determines whether or not the phase difference Δφ between the two resolver signals (f(t)sin θ and f(t)cos θ) is an error based on the phase difference spectrum phs and the peak frequencies ωp1 and ωp2. Specifically, the resolver signal phase difference determination unit 33 compares both or one of the phase differences Δφ between the two resolver signals at the peak frequencies ωp1 and ωp2 with an expected value of 90°. For example, as shown in FIG. 4, when the phase difference Δφ deviates from a predetermined normal range centered at an expected value of 90° by a predetermined number of times or for a predetermined time, the resolver signal phase difference determination unit 33 determines that the phase difference Δφ is an error.

As described above, by comparing the phase difference φφ obtained from the phase difference spectrum with the expected value of 90°, the error of the phase difference Δφ of the resolver signal can also be detected with high accuracy and easily. In addition, the circuit configuration of the resolver signal phase difference determination unit 33 can be simplified. The resolver signal phase difference determination unit 33 outputs the determination result to the error output control unit 40.

As shown in FIG. 10, the resolver signal amplitude determination unit 34 determines whether or not the amplitude of the resolver signal is an error based on the power spectrum pws and the peak frequencies ωp1 and ωp2. Here, since the square of the amplitude is a power value, an error in the amplitude can be determined based on the power spectrum pws. The resolver signal amplitude determination unit 34 performs error determination using at least one of the power spectra pws obtained from the two resolver signals (f(t)sin θ and f(t)cos θ).

Figure 12:
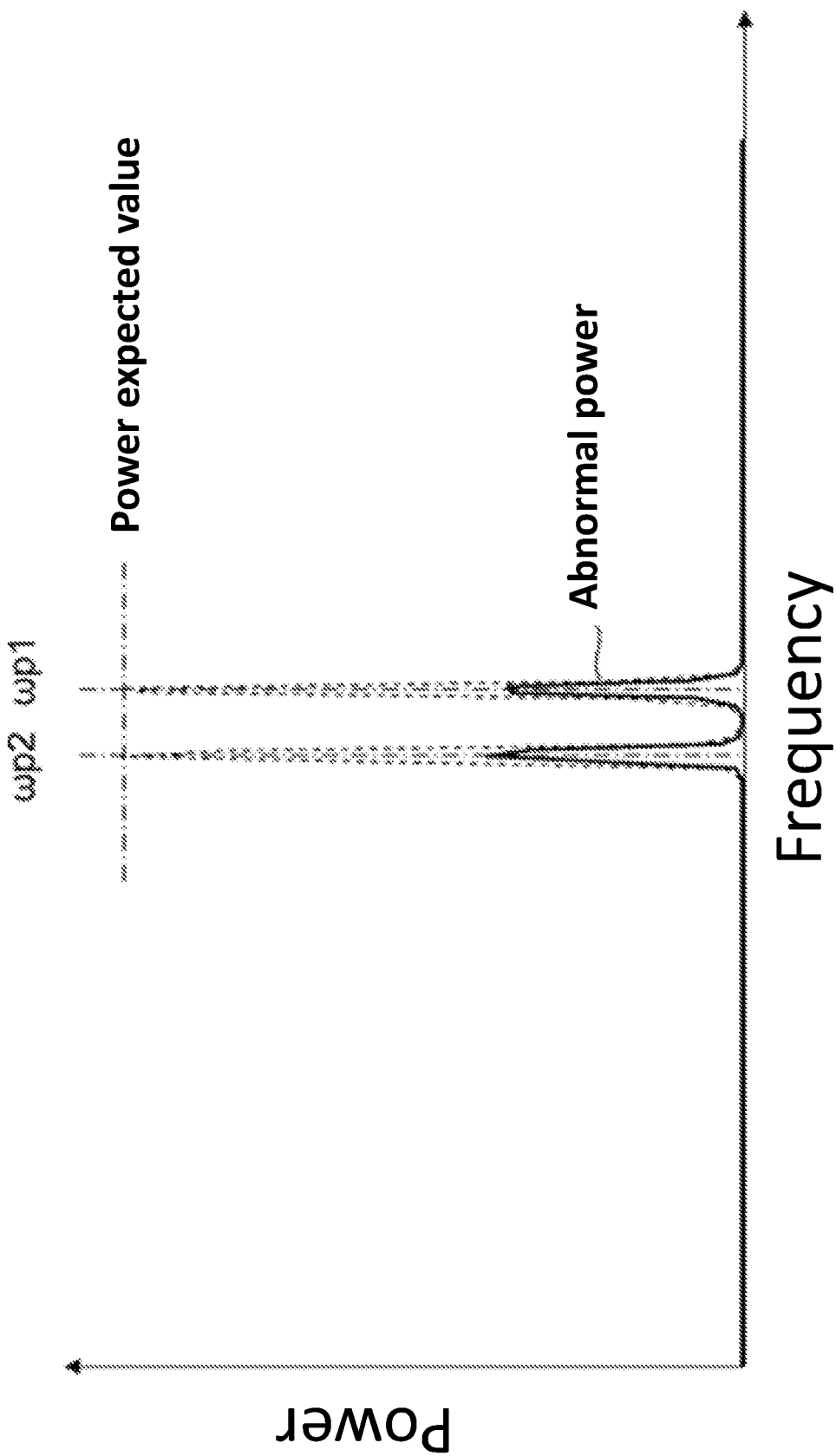
FIG. 12 is a graph of a power spectrum schematically showing an error determination method in the resolver signal amplitude determination unit 34.

Here, FIG. 12 is a graph of a power spectrum schematically showing an error-detecting method in the resolver signal amplitude determination unit 34. For example, when both or one of the deviations between the power value and the expected value at the peak frequencies ωp1 and ωp2 deviations from the predetermined reference range by a predetermined number of times or for a predetermined time, the resolver signal amplitude determination unit 34 determines that the amplitude of the resolver signal is an error. An average of both deviations is used. FIG. 12 shows a case where the power values at the two peak frequencies ωp1 and ωp2 fall below a predetermined reference range and are determined to be abnormal.

Thus, based on the power values at the peak frequencies ωp1 and ωp2 of the power spectrum pws, an error in the amplitude of the resolver signal can be detected accurately and easily. In addition, the circuit configuration of the resolver signal amplitude determination unit 34 can be simplified. The resolver signal amplitude determination unit 34 outputs the determination result to the error output control unit 40.

As shown in FIG. 10, the noise determination unit 35 determines whether or not abnormal noise has occurred based on the power spectrum pws and the peak frequencies ωp1 and ωp2. The noise determination unit 35 performs error determination using at least one of the power spectra pws obtained from the two resolver signals (f(t)sin θ and f(t)cos θ).

Figure 13:
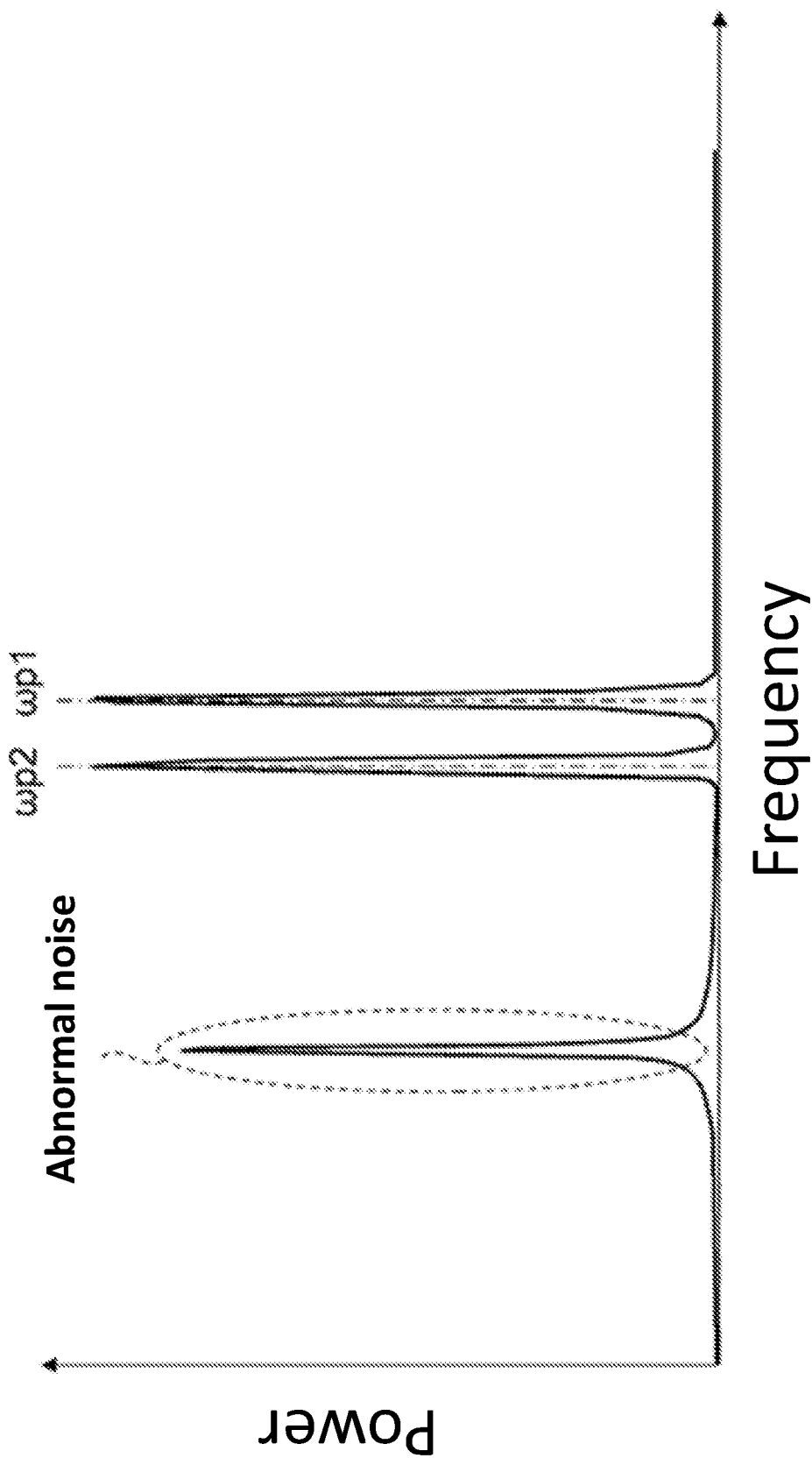
FIG. 13 is a graph of a power spectrum schematically showing an error determination method in the noise determination unit 35.

Here, FIG. 13 is a graph of a power spectrum schematically showing an error-detecting method in the noise determination unit 35. As shown in FIG. 13, peaks appearing at frequencies other than the two peak frequencies ωp1 and ωp2 are noise. Therefore, when the peak value of the noise exceeds the predetermined reference value a predetermined number of times or for a predetermined period of time, the noise determination unit 35 determines that the noise is abnormal noise.

As described above, the abnormal noise can be detected accurately and easily based on peaks appearing at frequencies other than the peak frequencies ωp1 and ωp2 in the power spectrum pws. In addition, the circuit configuration of the noise determination unit 35 can be simplified. The noise determination unit 35 outputs the determination result to the error output control unit 40. Further, the noise determination unit 35 may hold the frequency at which the abnormal noise has occurred or may output the frequency to the error output control unit 40.

As shown in FIG. 10, the direct current component determination unit 36, based on the power spectrum pws, determines whether the direct current component (power value in the frequency 0) is an error or not. The DC component determination unit 36 performs error determination using at least one of the power spectra pws obtained from the two resolver signals (f(t)sin θ and f(t)cos θ).

Here, FIG. 13 is a graph of a power spectrum systematically showing an error-detecting method in the direct current component determination unit 36. As shown in FIG. 13, when the power value in the frequency 0 is the expected value 0 exceeds a predetermined number of times or time reference value, the direct current component determination unit 36 determines that the direct current component is an error.

Thus, based on the power spectrum pws, the error of the direct current component (power value at frequency 0) can be detected accurately and easily. Further, it is possible to simplify the circuit configuration of the direct current component determination unit 36. The direct current component determination unit 36 outputs the determination result to the error output control unit 40.

As shown in FIG. 10, the S/N determination unit 37 determines whether or not the signal-to-noise ratio (S/N) is an error based on the power spectrum pws. The signal at S/N is at least one of the signals at the peak frequencies ωp1 and ωp2, and the noise is background noise. The S/N determination unit 37 performs error determination using at least one of the power spectra pws obtained from the two resolver signals (f(t)sin θ and f(t)cos θ). When the S/N obtained from the power spectrum pws falls below the predetermined reference value a predetermined number of times or for a predetermined time, the S/N determination unit 37 determines that the S/N is an error.

As described above, the error of the S/N can be detected accurately and easily based on the power spectrum pws. In addition, the circuit configuration of the S/N determination unit 37 can be simplified. The S/N determination unit 37 outputs the determination result to the error output control unit 40.

The error output control unit 40 generates an error signal err based on the determination result output from each determination unit such as the resolver signal phase difference determination unit 33 of the error determination unit 30. Then, the error output control unit 40 outputs an error signal err to the processing unit CPU by, for example, interrupt processing. When the error signal err is generated in the resolver signal, for example, the processing unit CPU safely stops the motor MT. Alternatively, the processing unit CPU may continue to control the motor MT based only on the digital current signal dc.

As described above, in the semiconductor device 100 according to present embodiment, the resolver signal is converted from the time-domain to the frequency-domain in the domain converter DT, and the spectrum of the resolver signal converted to the frequency-domain is analyzed in the spectrum analyzer SA. That is, the spectrum of the resolver signal converted from the time domain to the frequency domain is analyzed.

The resolver signal has only two frequency components, an excitation frequency ωc and a resolver rotation frequency ωr. Therefore, as compared with detecting an error in real-time, present embodiment according to semiconductor device 100 suppresses the effect of noises and can detect an error with high accuracy and easily. Further, since the error detection is facilitated, the circuit configuration of the error determination unit 30 of the error detection unit ED can be simplified, and the chip area of semiconductor device 100 can be reduced, as described above.

Figure 15:
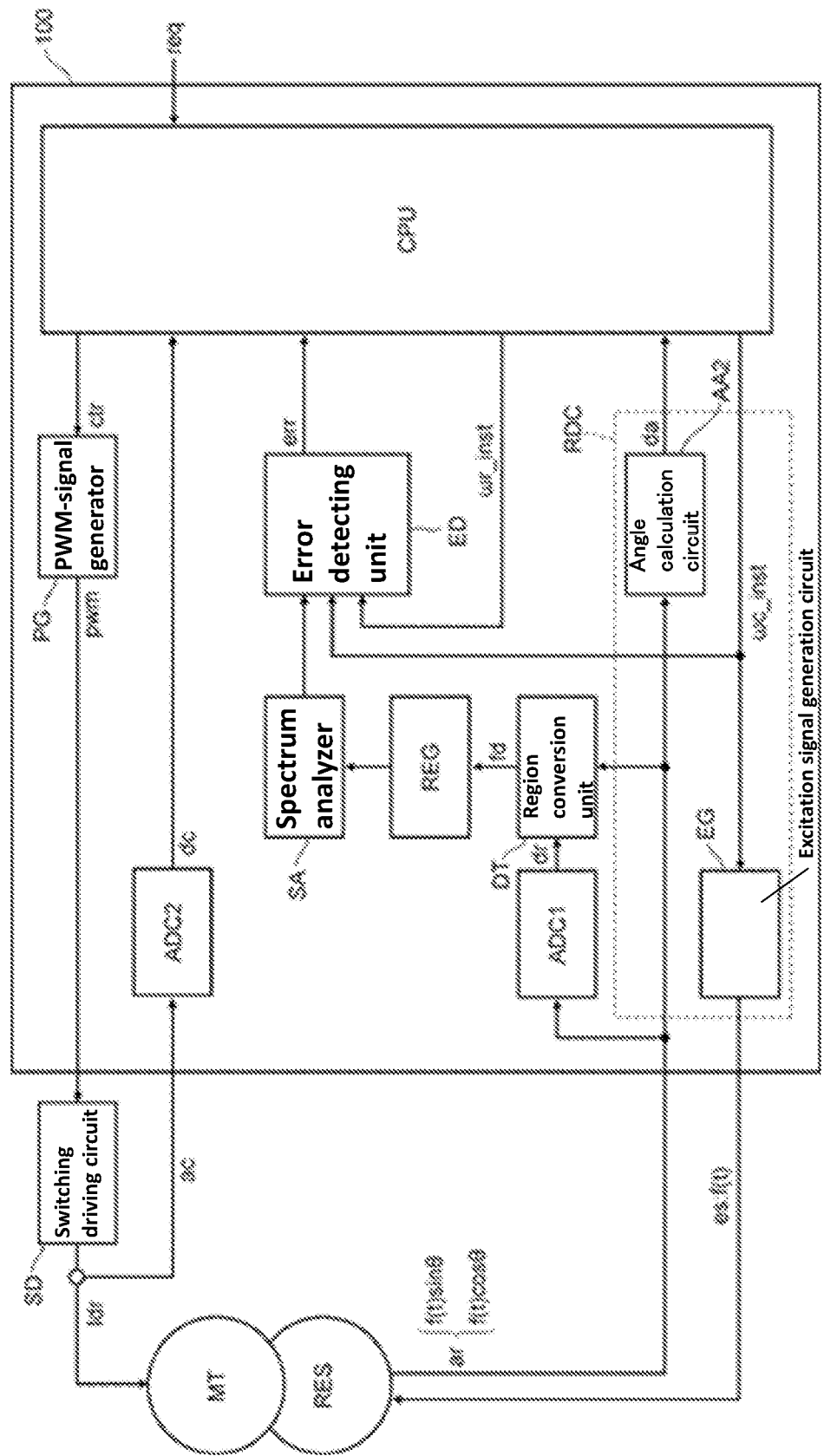
FIG. 15 is a detailed block diagram a configuration of a modified example according to semiconductor device 100 according to the first embodiment.
Figure 16:
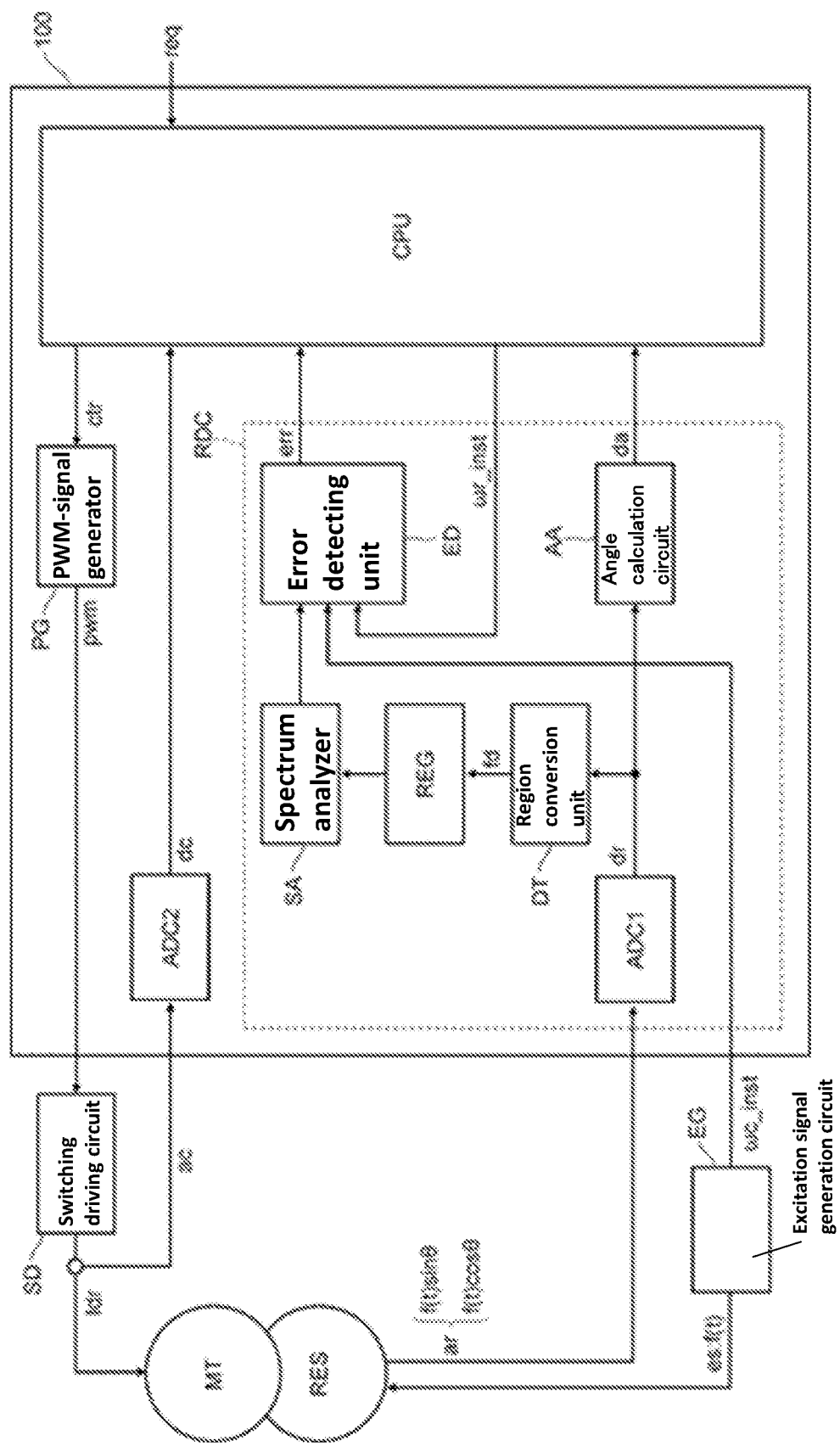
FIG. 16 is a detailed block diagram a configuration of a modified example according to semiconductor device 100 according to the first embodiment.

Here, referring to FIGS. 15 and 16, a modification of the first embodiment according to other semiconductor devices will be described. FIGS. 15 and 16 are detailed block diagrams showing the configuration of modified example according to semiconductor device 100 according to the first embodiment.

First, semiconductor device 100 shown in FIG. 15 will be described. In semiconductor device 100 shown in FIG. 5, the resolver/digital converter RDC comprises an analog/digital converter ADC1, a domain converter DT, a register REG, a spectrum analyzer SA, and an error detector ED. On the other hand, in semiconductor device 100 shown in FIG. 15, the analog/digital converter ADC1, the region converter DT, the register REG, the spectrum analyzer SA, and the error detector ED are not included in the resolver/digital converter RDC.

Here, the resolver/digital converter RDC includes an angle operation circuit AA2 and an excitation signal generation circuit EG. The angle calculation circuit AA shown in FIG. 5 calculates the digital angle signal da from the digital resolver signal dr outputted from the analog/digital converter ADC1. On the other hand, the angle calculation circuit AA2 shown in FIG. 15 directly calculates the digital angle signal da from the analog resolver signal ar outputted from the resolver RES. The rest of the configuration is the same as that of semiconductor device 100 shown in FIG. 5, and therefore the explanation thereof is omitted.

Next, semiconductor device 100 shown in FIG. 16 will be described. Semiconductor device 100 shown in FIG. 5 includes excitation-signal generating circuits EG in the resolver/digital converter RDC. On the other hand, semiconductor device 100 shown in FIG. 15 does not include the excitation signal generation circuit EG inside but includes the excitation signal generation circuit EG outside. Then, the excitation frequency instruction value ωc_inst output from the excitation signal generation circuit EG is input to the error detection unit ED. The rest of the configuration is the same as that of semiconductor device 100 shown in FIG. 5, and therefore the explanation thereof is omitted. In semiconductor device 100 shown in FIGS. 15 and 16, the same effects as those of semiconductor device 100 shown in FIG. 5 can be obtained.

Second Embodiment

<Detailed Configuration of the Semiconductor Device 200>

Figure 17:
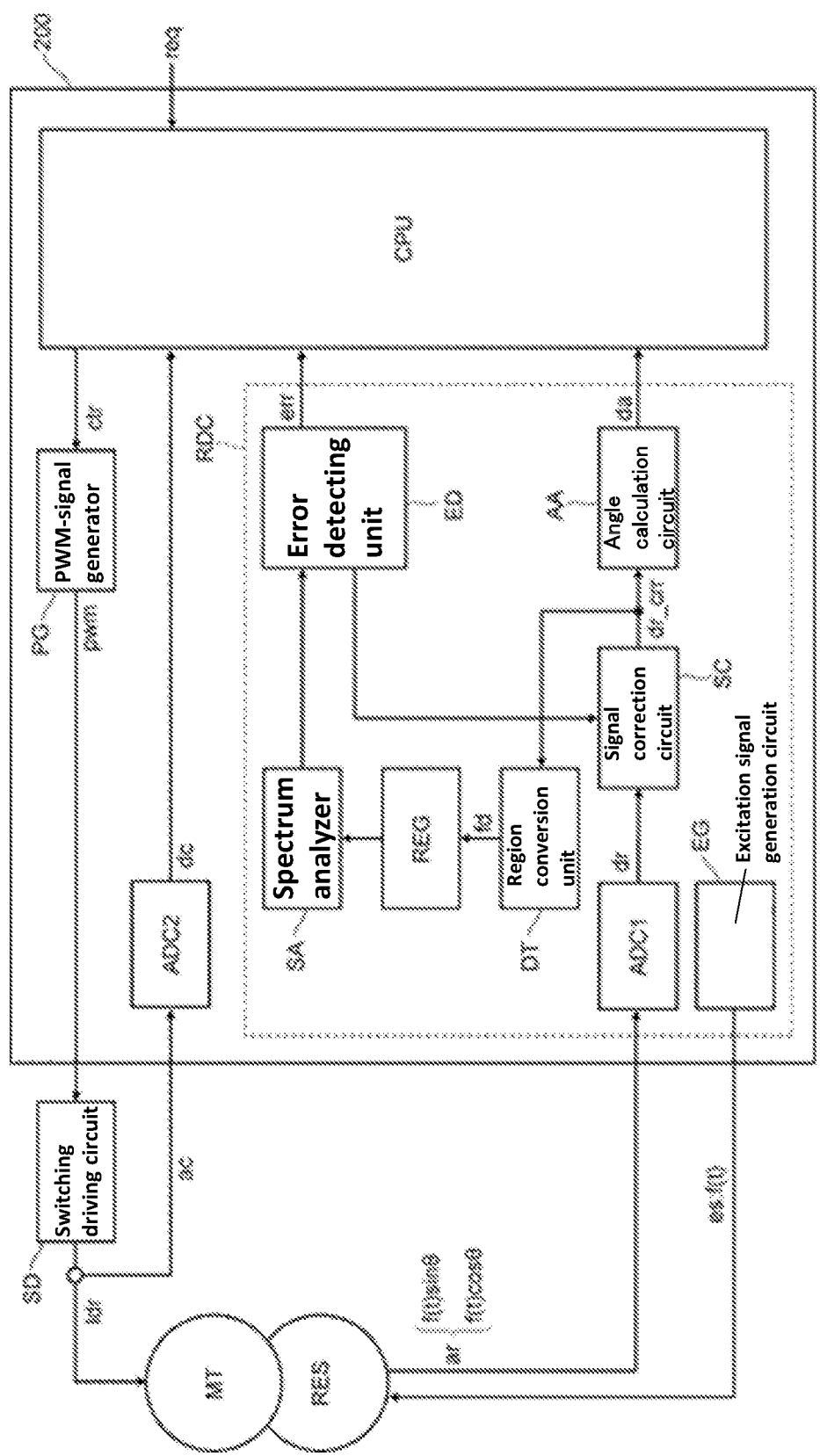
FIG. 17 is a detailed block diagram showing a configuration of a semiconductor device 200 according to a second embodiment.

Next, with reference to FIG. 17, the semiconductor device according to the second embodiment will be described in detail. FIG. 17 is a detailed block diagram showing the configuration of a semiconductor device 200 according to the second embodiment. In contrast to semiconductor device 100 shown in FIG. 5, in semiconductor device 200 shown in FIG. 17, the resolver/digital converter RDC further includes a signal-correction circuit SC.

As shown in FIG. 17, the signal-correcting circuit SC is provided between the analog/digital converter ADC1 and the angle-calculating circuit AA. The digital resolver signal dr outputted from the analog/digital converter ADC1 is inputted to the signal corrector SC. The signal correction circuit SC corrects the digital resolver signal dr based on the output signal from the error detection unit ED, and outputs the corrected digital resolver signal dr_crr. The angle calculation circuit AA calculates the digital angle signal da from the corrected digital resolver signal dr_crr, and outputs the digital angle signal da to the processing unit CPU.

The corrected digital resolver signal dr_crr is input to the domain conversion unit DT instead of the digital resolver signal dr. Also, in according to semiconductor device 200 of the second embodiment, the digital resolver signals dr is inputted to the region converter DT.

Figure 18:
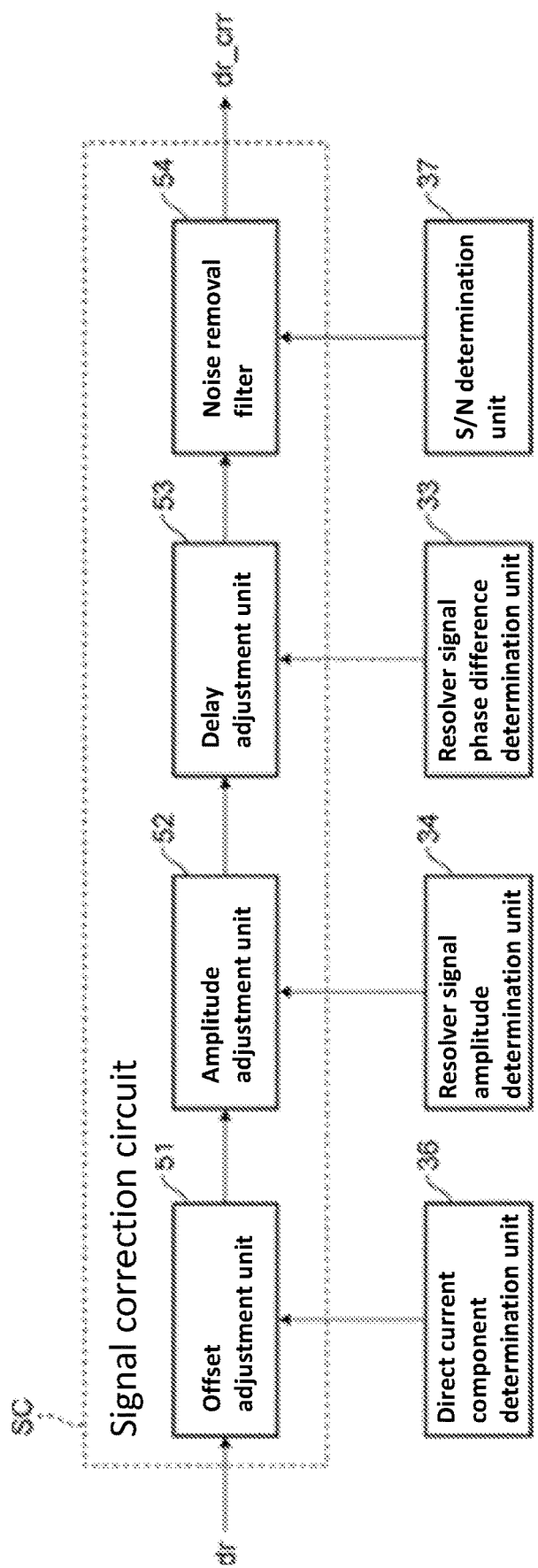
FIG. 18 is a block diagram an example of a signal correction circuit SC.

Here, a detailed configuration of the signal correction circuit SC will be described with reference to FIG. 18. FIG. 18 is a block diagram an example of the signal correction circuit SC. In the example of FIG. 18, the signal correction circuit SC includes an offset adjustment unit 51, an amplitude adjustment unit 52, a delay adjustment unit 53, and a noise removal filter 54.

Figure 14:
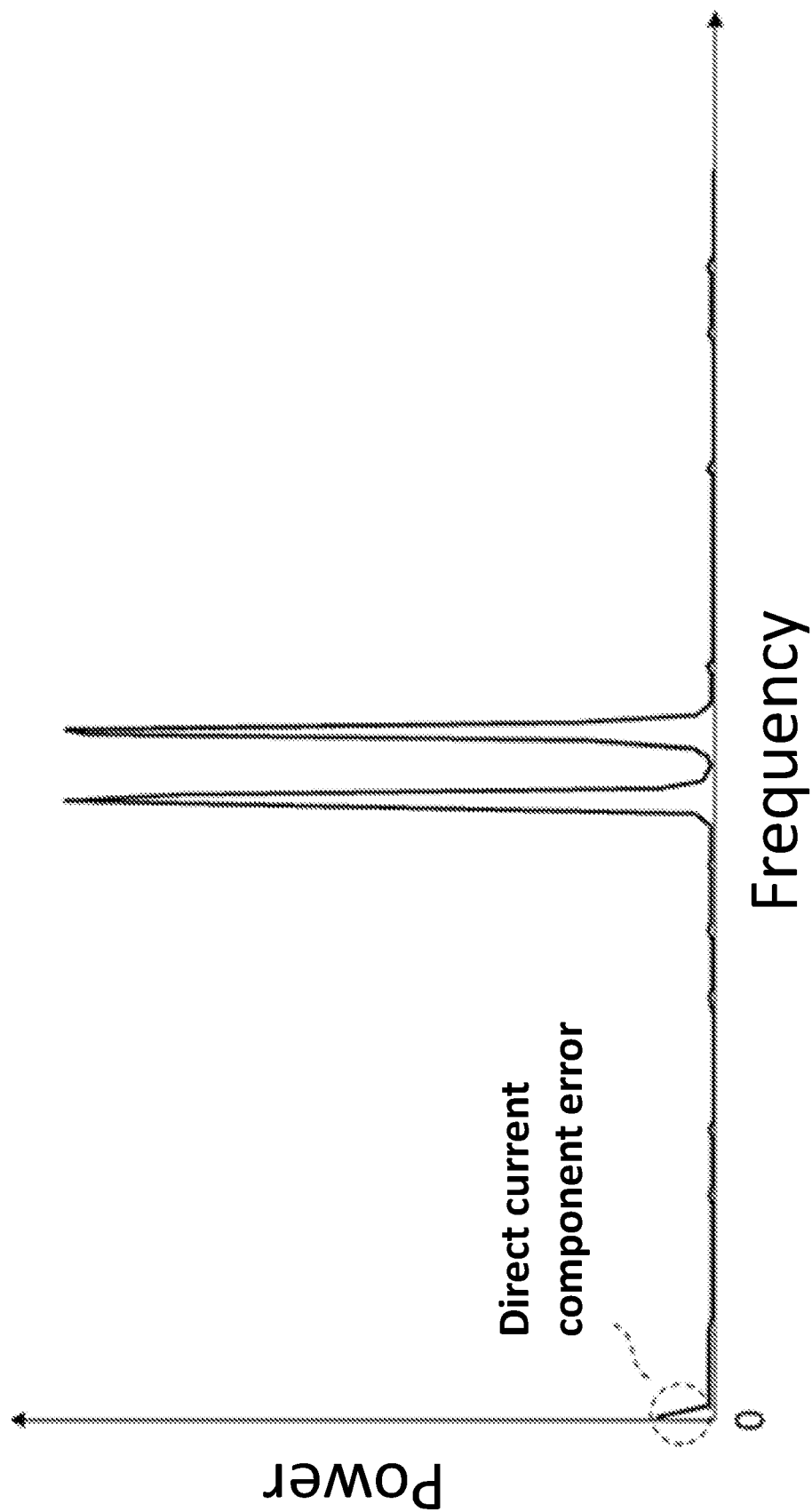
FIG. 14 is a graph of the power spectrum showing a systematically error-detecting method in the direct current component determination unit 36.

Offset adjustment unit 51 adjusts the offset amount of the digital resolver signal dr so that the direct current component (power value in the frequency 0) in the power spectrum shown in FIG. 14 becomes 0. For example, as shown in FIG. 18, the offset adjustment unit 51 receives a direct current component value used by the direct current component determination unit 36 for determining, adjusts the offset amount. For two resolver signals (f(t)sin θ and f(t)cos θ), it is preferable to adjust the offset amount using each direct current component.

The amplitude adjustment unit 52 adjusts the amplitude of the digital resolver signal dr so that the power values at the peak frequencies ωp1 and ωp2 shown in FIG. 12 approach the expected value. For example, as shown in FIG. 18, the amplitude adjustment unit 52 adjusts the amplitude of the digital resolver signal dr based on the deviation between the power value and the expected value at the peak frequencies ωp1 and ωp2 used in the determination by the resolver signal amplitude determination unit 34, or both or one of the deviations. When both deviations are used, the amplitude of the digital resolver signal dr is adjusted using, for example, the average value of the deviations. For the two resolver signals (f(t)sin θ and f(t)cos θ), the respective deviations are preferably used to adjust the amplitude.

The delay adjustment unit 53 adjusts the delay amount of both or one of the digital resolver signals dr(f(t)sin θ and f(t)cos θ) so that the phase difference Δφ between the two resolver signals (f(t)sin θ and f(t)cos θ) shown in FIG. 4 approaches the expected value 90°. For example, as shown in FIG. 18, the delay adjustment unit 53 receives the phase difference Δφ used in the determination by the resolver signal phase difference determination unit 33 and adjusts the delay amount.

The noise removal filter 54 removes noise from the digital resolver signal dr. As the noise-removing filter 54, a FIR (Finite Impulse Response) filter, an IIR (Infinite Impulse Response) filter, or the like can be used. For example, as shown in FIG. 18, the noise removal filter 54 receives the S/N of the power spectrum used for the determination by the S/N determination unit 37 and adjusts the filter coefficient. For the two resolver signals (f(t)sin θ and f(t)cos θ), the respective S/N is preferably used to adjust the filter coefficients.

As described above, in the second embodiment of according to semiconductor device 200, the signal correcting circuit SC corrects the digital resolver signal dr. By using the corrected digital resolver signal dr_crr, the angle calculation circuit AA can calculate the digital angle signal da with high accuracy. The signal correction circuit SC can automatically correct the digital resolver signal dr based on the signal fed back from the error detection unit ED.

The rest of the configuration is the same as that of semiconductor device 100 shown in FIG. 5, and therefore the explanation thereof is omitted. In semiconductor device 200 shown in FIG. 17, the same effects as those of semiconductor device 100 shown in FIG. 5 can be obtained.

Third Embodiment

<Detailed Configuration of the Semiconductor Device 300>

Figure 19:
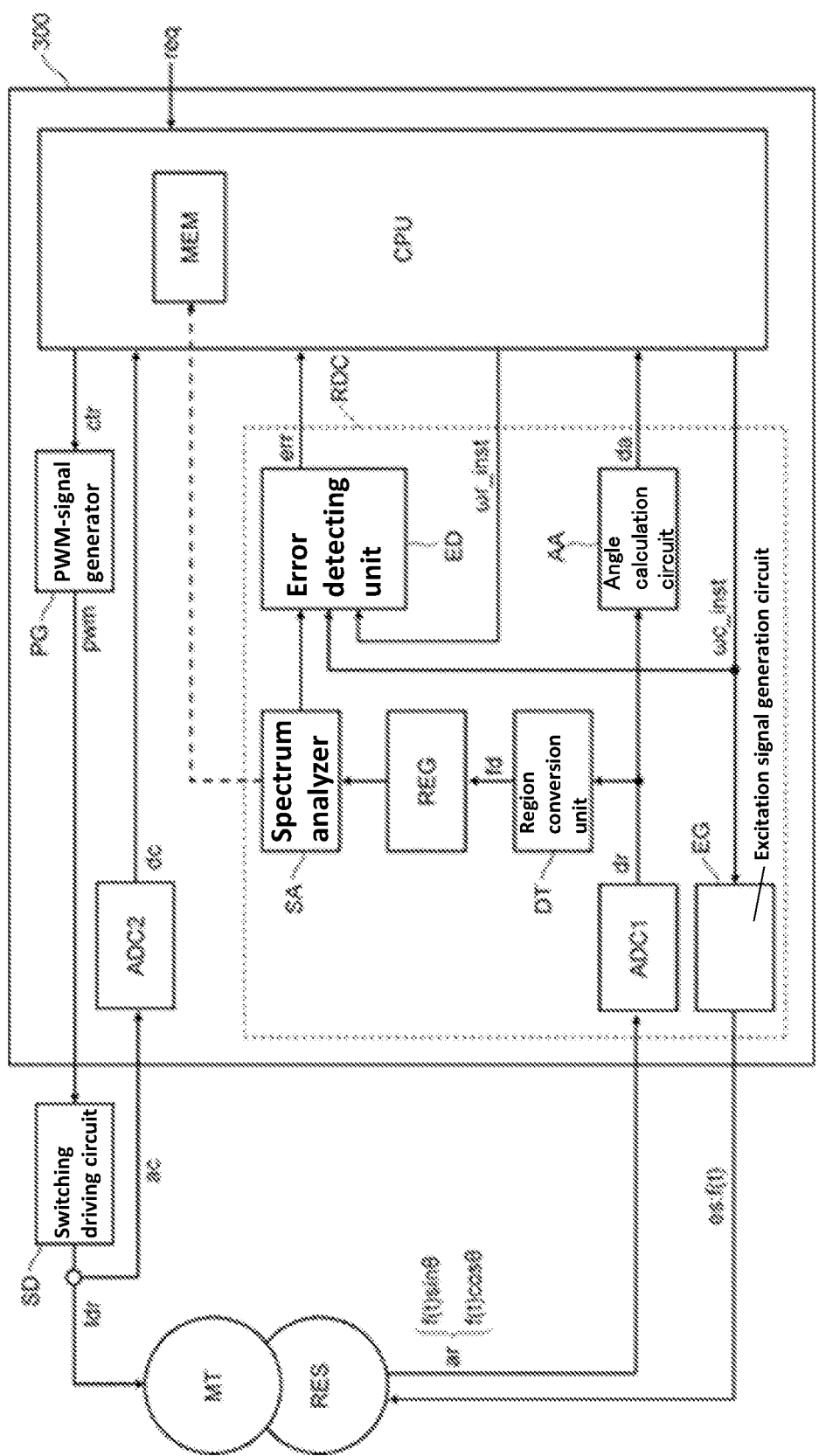
FIG. 19 is a detailed block diagram showing a configuration of semiconductor device 300 according to a third embodiment.

Next, with reference to FIG. 19, the semiconductor device according to the third embodiment will be described in detail. FIG. 19 is a detailed block diagram showing the configuration of a semiconductor device 300 according to the third embodiment. In contrast to semiconductor device 100 shown in FIG. 5, in semiconductor device 300 shown in FIG. 19, the processor CPU further includes a memory MEM for storing the power spectrum and the phase-difference spectrum.

Figure 20:
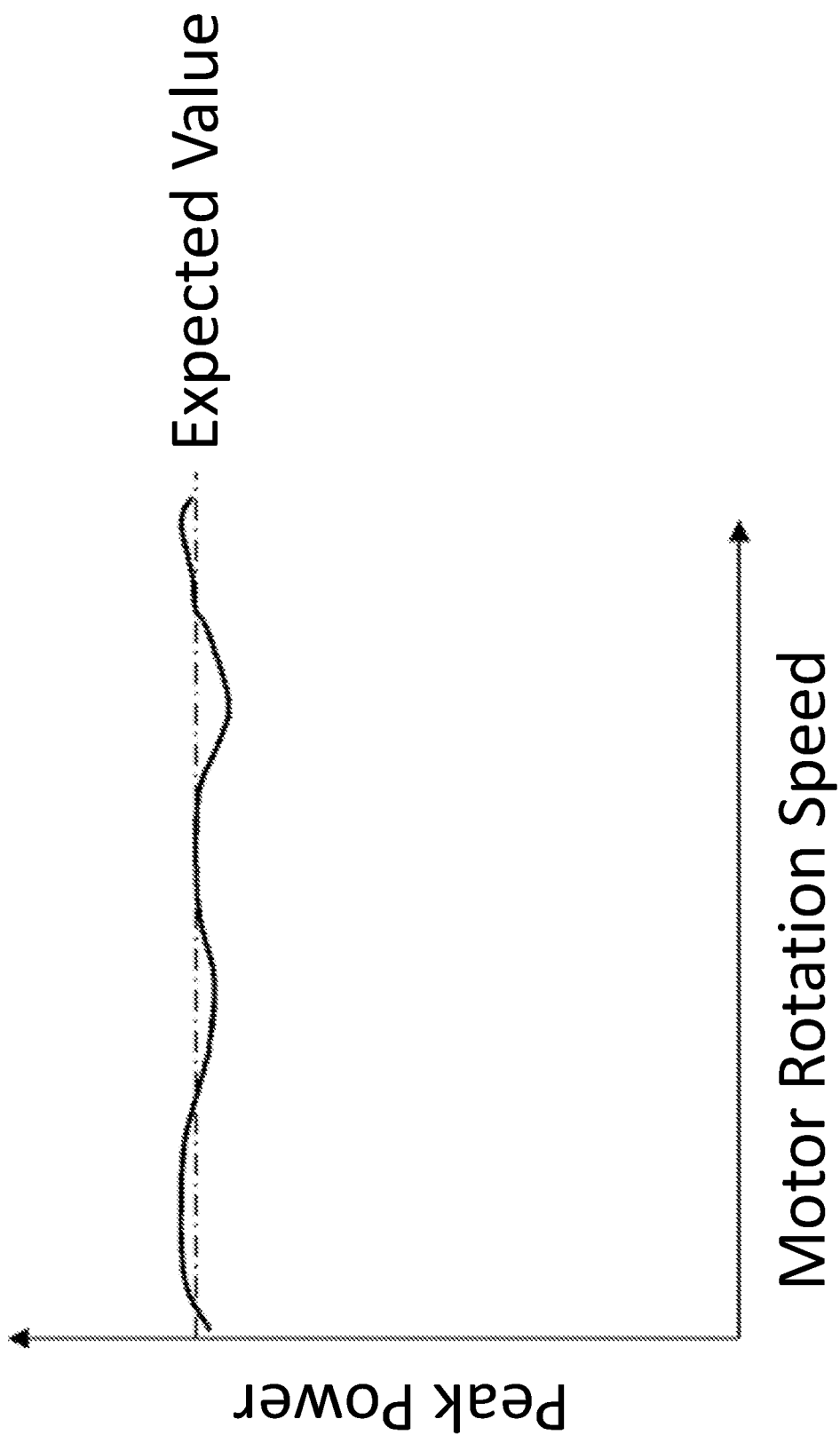
FIG. 20 is a graph showing the dependence of the peak power on the motor rotation speed at the peak frequencies ωp1 and ωp2.

Here, FIG. 20 is a graph showing changes in the power (peak power) at the peak frequencies ωp1 and ωp2 with respect to the motor rotation speed. The dependence of the peak power on the motor rotation speed shown in FIG. 20 is obtained from the power spectrum calculated by the power spectrum calculation unit 22 of the spectrum analysis unit SA. Specifically, the characteristic as shown in FIG. 20 is obtained by investigating the peak power of the power spectrum while changing the motor rotation speed from a low speed to a high speed in advance.

Figure 21:
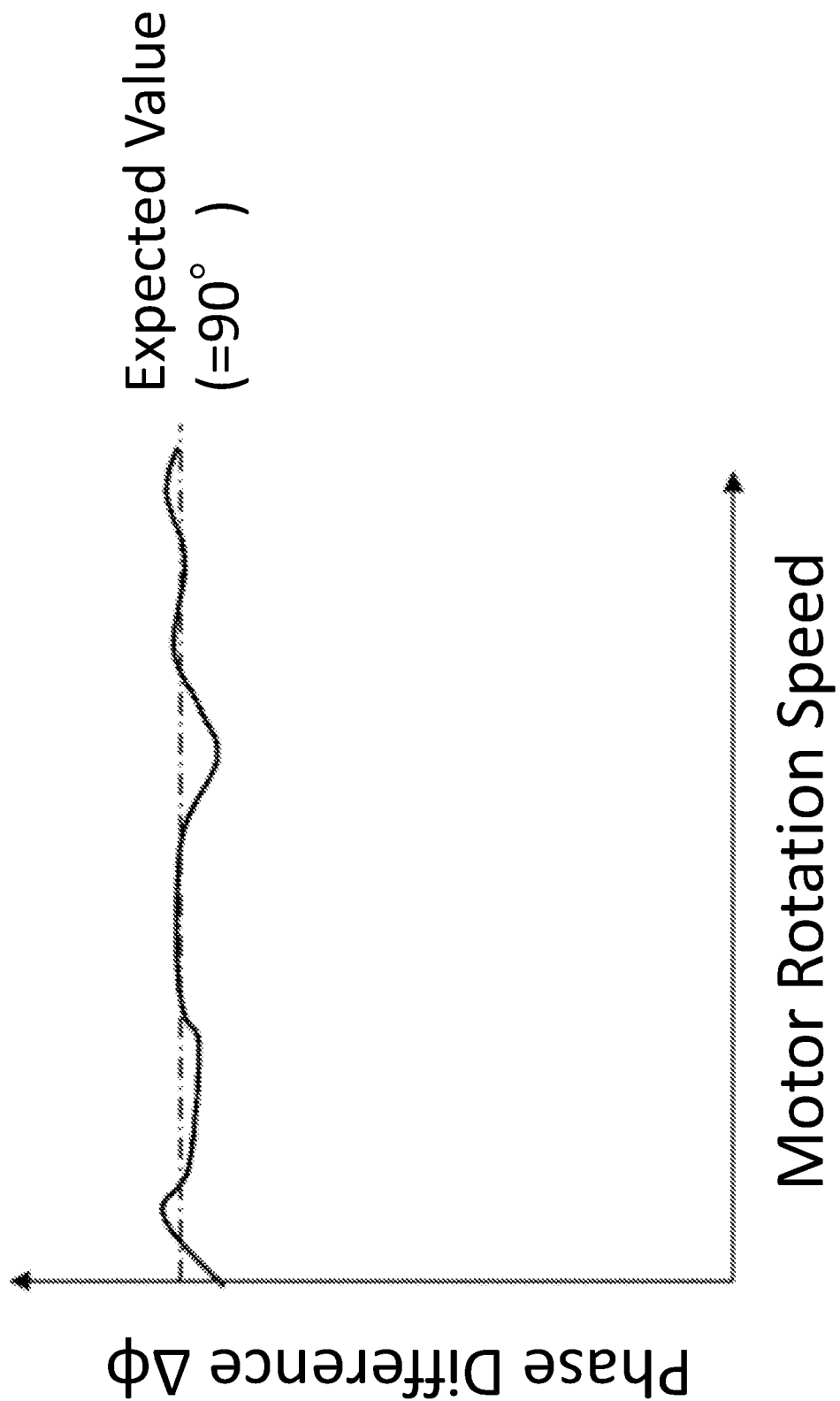
FIG. 21 is a graph showing the motor rotation speed dependence of the phase difference Δφ of the two resolver signals (f(t)sin θ and f(t)cos θ).

FIG. 21 is a graph showing a change in the phase difference Δφ between the two resolver signals (f(t)sin θ and f(t)cos θ) with respect to the motor rotation speed. The motor rotation speed dependence of the phase difference Δφ shown in FIG. 21 is obtained from the phase difference spectrum calculated by the phase difference spectrum calculation unit 21 of the spectrum analysis unit SA. Specifically, by investigating the phase difference spectrum while changing the motor rotation speed from low speed to high speed in advance, the characteristics as shown in FIG. 21 can be obtained.

In present embodiment according to semiconductor device 300, a map (first map) showing the dependency of the peak power on the motor rotation speed shown in FIG. 20 and a map (second map) of the dependency of the phase difference Δφ on the motor rotation speed shown in FIG. 21 are stored in the memories MEMs. These maps are generated in advance by the spectrum analyzer SA and stored in the memory MEM, as indicated by the broken line arrows in FIG. 19.

Therefore, at each motor rotation speed, the processing unit CPU refers to the map stored in the memory MEM and corrects the digital angle signal da output from the angle calculation circuit AA. The digital angle signal da can be corrected without providing the signal correction circuit SC shown in FIG. 17.

Instead of the processing unit CPU, the resolver/digital converter RDC may include a memory MEM for storing the maps shown in FIGS. 20 and 21. Then, for example, the angle calculation circuit AA may refer to the map and output the digital angle signal da corrected in advance.

The rest of the configuration is the same as that of semiconductor device 100 shown in FIG. 5, and therefore the explanation thereof is omitted. In semiconductor device 300 shown in FIG. 19, the same effects as those of semiconductor device 100 shown in FIG. 5 can be obtained.

Although the invention made by the inventor has been specifically described based on the embodiment, the present invention is not limited to the embodiment already described, and it is needless to say that various modifications can be made without departing from the gist thereof.

What is claimed is:

1. A semiconductor device comprising:
   an analog/digital converter that digitizes a resolver signal, which is an analog signal;
   a domain converter for converting the resolver signal digitized by the analog/digital converter from a time domain to a frequency domain;
   a spectrum analyzer for analyzing a spectrum of the resolver signal converted into the frequency domain by the domain converter; and
   an error detector for detecting an error related to the resolver signal based on an output signal from the spectrum analyzer,
   wherein the spectrum is a power spectrum or an amplitude spectrum,
   wherein the spectrum analyzer calculates a frequency of an excitation signal of a resolver using a frequency at the maximum peak occurring in each of an upper sideband wave and a lower sideband wave in the spectrum, and
   wherein the error detector compares the calculated frequency of the excitation signal with an instruction value to detect an error in the frequency of the excitation signal.

2. The semiconductor device according to claim 1, further comprising:
   an excitation signal generator for generating the excitation signal based on the instruction value and outputting the excitation signal to the resolver.

3. A semiconductor device comprising:
   an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter; and an error detector for detecting an error related to the resolver signal based on an output signal from the spectrum analyzer, wherein the spectrum is a power spectrum or an amplitude spectrum, wherein the spectrum analyzer calculates a rotation frequency of a resolver using a frequency at the maximum peak occurring in each of an upper sideband wave and a lower sideband wave in the spectrum, and wherein the error detector compares the calculated rotation frequency with an instruction value to detect an error in the rotation frequency.

4. A semiconductor device comprising:

an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter; and an error detector for detecting an error related to the resolver signal based on an output signal from the spectrum analyzer, wherein the spectrum is a power spectrum or an amplitude spectrum, and wherein the error detector detects an error in an amplitude of the resolver signal based on magnitudes of at least one of the maximum peaks occurring in an upper sideband wave and a lower sideband wave, respectively, in the spectrum.

5. The semiconductor device according to claim 4, further comprising:

a signal correction circuit for correcting the amplitude of the digitized resolver signal based on a signal from the error detector; and an angle calculation circuit for calculating a digital angle signal from the resolver signal corrected by the signal correction circuit.

6. The semiconductor device according to claim 5, wherein the domain converter converts the resolver signal corrected by the signal correction circuit from the time domain to the frequency domain.

7. A semiconductor device comprising:

an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter; and an error detector for detecting an error related to the resolver signal based on an output signal from the spectrum analyzer, wherein the resolver signal is a two-phase signal having a constant phase difference, wherein the spectrum is a phase difference spectrum indicating a phase difference of the resolver signal, and wherein the error detector detects an error in the phase differences of the resolver signals based on the spectrum.

8. The semiconductor device according to claim 7, further comprising:

a signal correction circuit for correcting the phase difference of the digitized resolver signal based on a signal from the error detector; and an angle calculation circuit for calculating a digital angle signal from the resolver signal corrected by the signal correction circuit.

9. The semiconductor device according to claim 8, wherein the domain converter converts the resolver signal corrected by the signal correction circuit from the time domain to the frequency domain.

10. A semiconductor device comprising:

an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter; and an error detector for detecting an error related to the resolver signal based on an output signal from the spectrum analyzer, wherein the spectrum is a power spectrum or an amplitude spectrum, in which the error detector detects an error in a direct current component of the resolver signal based on a magnitude of the spectrum at frequency 0.

11. The semiconductor device according to claim 10, further comprising:

a signal correction circuit for correcting the direct current component of the digitized resolver signal based on a signal from the error detector; and an angle calculation circuit for calculating a digital angle signal from the resolver signal corrected by the signal correction circuit.

12. The semiconductor device according to claim 11, wherein the domain converter converts the resolver signal corrected by the signal correcting circuit from the time domain to the frequency domain.

13. A semiconductor device comprising:

an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter; and an error detector for detecting an error related to the resolver signal based on an output signal from the spectrum analyzer, wherein the spectrum is a power spectrum or an amplitude spectrum, and wherein the error detector determines a peak other than the maximum peak occurring in each of an upper sideband wave and a lower sideband wave in the spectrum as noise and detects abnormal noise of the resolver signal based on a magnitude of the noise.

14. A semiconductor device according to claim 1 comprising:

an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter; and an error detector for detecting an error related to the resolver signal based on an output signal from the spectrum analyzer, wherein the spectrum is a power spectrum or an amplitude spectrum, and wherein the error detector detects an error in a signal-to-noise ratio of the resolver signal based on a magnitude of at least one of the maximum peak occurring in each of an upper sideband wave and a lower sideband wave and a magnitude of background noise in the spectrum.

15. A semiconductor device comprising:

an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter; and an error detector for detecting an error related to the resolver signal based on an output signal from the spectrum analyzer, wherein the analog/digital converter is included in a resolver/digital converter that converts the resolver signal into a digital angle signal, and wherein the resolver/digital converter further comprises an angle calculation circuit for calculating the digital angle signal from the digitized resolver signal.

16. A semiconductor device comprising:

an analog/digital converter that digitizes a resolver signal, which is an analog signal;

a domain converter for converting the resolver signal digitized by the analog/digital converter from a time domain to a frequency domain;

a spectrum analyzer for analyzing a spectrum of the resolver signal converted into the frequency domain by the domain converter;

an error detector for detecting an error related to the resolver signal based on an output signal from the spectrum analyzer; and a resolver/digital converter for converting the resolver signal into a digital angle signal, wherein the analog/digital converter is external to the resolver/digital converter.

17. A motor control system comprising:

a motor;

a resolver for detecting a rotation angle of the motor;

a semiconductor device for generating a control signal based on a resolver signal outputted from the resolver; and a driving circuit for driving the motor based on the control signal, wherein the semiconductor device comprises:

an analog/digital converter for digitizing a resolver signal, which is an analog signal;

a domain converter for converting the resolver signal digitized by the analog/digital converter from a time domain to a frequency domain;

a spectrum analyzer for analyzing a spectrum of the resolver signal converted to the frequency domain by the domain converter; and an error detector for detecting an error related to the resolver signal based on an output signal from the spectrum analyzer, wherein the semiconductor device further comprises:

angle calculation circuitry for calculating a digital angle signal from the resolver signal digitized by the analog/digital converter, and wherein the spectrum analyzer generates a first map indicating a change in an amplitude of the resolver signal with rotation speed of the motor and a second map indicating a change in a phase difference of the resolver signal with the rotation speed of the motor, and corrects the digital angle signal based on the first and second maps according to the rotation speed of the motor.

* * * * *